United States Patent
Bergeron et al.

(10) Patent No.: US 7,548,549 B2
(45) Date of Patent: Jun. 16, 2009

(54) METHOD AND APPARATUS FOR TRANSMISSION OF DIGITAL SIGNALS OVER A COAXIAL CABLE

(75) Inventors: Jeffrey James Bergeron, Ottawa (CA); Huck Kung Loh, Kanata (CA); James Benson Bacque, Ottawa (CA); Derrick Remedios, Ottawa (CA)

(73) Assignee: Jacobi Systems Corporation, Ottawa, Ontario (CA)

( * ) Notice: Subject to any disclaimer, the term of this patent is extended or adjusted under 35 U.S.C. 154(b) by 643 days.

(21) Appl. No.: 11/265,245

(22) Filed: Nov. 3, 2005

(65) Prior Publication Data

US 2006/0092967 A1     May 4, 2006

Related U.S. Application Data

(60) Provisional application No. 60/624,538, filed on Nov. 4, 2004.

(51) Int. Cl.
*H04L 12/413* (2006.01)
(52) U.S. Cl. .................... 370/419; 370/445; 709/246
(58) Field of Classification Search ................... None
See application file for complete search history.

(56) References Cited

U.S. PATENT DOCUMENTS

| | | | |
|---|---|---|---|
| 6,233,235 B1 | 5/2001 | Burke | |
| 6,493,335 B1 * | 12/2002 | Darcie et al. | 370/344 |
| 6,522,151 B2 * | 2/2003 | Armistead et al. | 324/538 |
| 6,763,025 B2 | 7/2004 | Leatherbury | |
| 7,072,360 B2 * | 7/2006 | Dravida et al. | 370/468 |
| 7,405,650 B2 * | 7/2008 | Andrus et al. | 340/426.16 |
| 2002/0075875 A1 | 6/2002 | Dravida | |
| 2002/0085552 A1 * | 7/2002 | Tandon | 370/389 |
| 2002/0105965 A1 * | 8/2002 | Dravida et al. | 370/463 |
| 2002/0136203 A1 | 9/2002 | Liva | |
| 2004/0218606 A1 | 11/2004 | Leatherbury | |
| 2006/0153214 A1 * | 7/2006 | Moore et al. | 370/401 |

OTHER PUBLICATIONS

Advent Networks Overview, Powerpoint presentation 2003.
Narad Broadband Access Network (NBAN), While paper 2004.
Ethernet Technologies, Cisco Systems http://www.cisco.com/univercd/cc/td/doc/cisintwk/ito_doc/ethernet.htm, 2005.
Ethernet Physical Layer Specifications, published by Techfest.com at: http://www.techfest.com/networking/lan/ethernet.htm, 1999.

* cited by examiner

*Primary Examiner*—Hong Cho
*Assistant Examiner*—Robert C Scheibel
(74) *Attorney, Agent, or Firm*—Victoria Donnelly

(57) ABSTRACT

Ethernet packets are transmitted in full duplex mode over a single coaxial cable, such as RG6 and RG59. Symmetrical full duplex operation is achieved by separating the upstream and downstream signals in the frequency domain whereby a 100BaseT signal is transmitted unmodified in one direction while the other is modulated upon a high frequency carrier to be transmitted in the other direction. In a second embodiment, the separation is in the time domain whereby the signals are sampled in blocks, each block compressed in time and transmitted at a higher rate, thus allowing for the interleaving of upstream and downstream blocks on the same coaxial cable. In a third embodiment, different rate upstream and downstream signals are separated in the frequency domain, but without modulation. The resulting asymmetrical 1000/100 Mb/s Ethernet over coax link is valuable in network architectures where asymmetry in the up and down traffic loads is expected.

33 Claims, 11 Drawing Sheets

US 7,548,549 B2

METHOD AND APPARATUS FOR TRANSMISSION OF DIGITAL SIGNALS OVER A COAXIAL CABLE

RELATED APPLICATIONS

The present patent application claims priority from the U.S. provisional patent application Ser. No. 60/624,538 to Jeffrey Bergeron et al. entitled "PACKET SWITCHED DIGITAL NETWORK ON A COAX CABLE" filed on Nov. 4, 2004.

FIELD OF THE INVENTION

The invention relates to transmission of digital signals, and in particular to the transmission of 10-1000 Mb/s Ethernet digital signals over a coaxial cable.

BACKGROUND OF THE INVENTION

In digital communications systems, transmission of data over various media can take many physical forms, and follow any of a large number of protocols. A common protocol for the transmission of data in the form of packets is the Ethernet protocol, described in IEEE Standard 802.3. An overview of the Ethernet protocol, including a review of the various media forms is given in "Ethernet Technologies", published electronically by Cisco corporation. The original Ethernet was developed by Xerox in the 1970s as a coaxial cable network using a carrier sense multiple access/collision detect (CSMA/CD) protocol, providing a bus-like local area network (LAN) that allows a number of computers to share access to the same coaxial cable. Since then other media types have been introduced, and at present the Ethernet protocol is used primarily over twisted pair copper cable, and fiber optic cable. The article. "Techfest Ethernet Technical Summary", section 4.0 "Ethernet Physical Layer Specifications" provides a summary of the various physical layer specifications defined for Ethernet.

Because of the high performance/cost ratio, compared with other technologies, Ethernet is increasingly being used to provide basic digital packet communication in many networks, and for many applications beyond the original LAN of computers of the 1970s.

While the early implementations of Ethernet were limited to a broadcast oriented bus structure, with access to the bus being controlled with the CSMA/CD protocol, almost all recent versions of Ethernet rely on dedicated full-duplex links with point-to-point transmission of Ethernet frames (packets). In Metropolitan Area Networks (MAN) and Wide Area Networks (WAN), that are based on Ethernet switching, fiber optic cable is common, while in Local Area Networks (LAN), a hubbed or switched Ethernet architecture based on 10BaseT, 100BaseT and 1000BaseT is more common. In these, the Ethernet frames are transmitted over unshielded twisted pairs (UTP) at rates of 10, 100, and 1000 Mb/s respectively. UTP cable is generally more economical and easier to install than coaxial cable or fiber optic cable.

Digital technology is being applied in many industries. The conventional Cable Television Systems (CATV), originally developed with analog technology for the distribution of television signals to homes (and to a lesser extent, to businesses), are generally based on frequency division multiplexing (FDM) of channels, where each FDM channel carries a television program channel. Recently, the cable television industry has developed means to use digital technology in the distribution not only of television signals (digitally encoded television) but also in providing digital services such as MAN and internet access over an enhanced cable infrastructure, while generally maintaining the FDM structure of the systems. One such digitally enhanced system is described in U.S. Pat. No. 6,763,025 "Time division multiplexing over broadband modulation method and apparatus" issued to Leatherbury, et al.

Thus, a situation has developed where digital networks based wholly or partially on the Ethernet protocol are distributed in a number of different physical forms. For example, a household may subscribe to digital television services, distributed over coaxial cable to and within the dwelling, while the same household may also subscribe to internet. Internet access that may be provided to the dwelling over a coaxial cable or a Digital Subscriber Line (DSL). The subscriber may wish to make internet access available to computers in several rooms and thus requires the installation of a LAN. An Ethernet LAN based on UTP wiring is one available method today. At the same time, TV reception from the cable television system may also be required in more than one room, conventionally achieved by extending the coaxial cable from a splitter to these rooms.

FIG. 1 illustrates a typical home wiring, providing television, telephone, and internet services. FIG. 1 shows a dwelling 10 comprising: a cable splitter 12; two television sets 14 and 16; a DSL splitter 18; two telephones 20 and 22; a DSL modem 24; a LAN 26; and two personal computers 28 and 30. The LAN 26 may include a hub or router 32, connected by UTP cables 34 to the DSL modem 24, and to the personal computers 28 and 30. The telephones 20 and 22 are connected to the DSL splitter 18 over an in-house telephone wiring 36, and the television sets 14 and 16 are connected to the cable splitter 12 over in-house coaxial cables 38. The signals for the television sets arrive from outside the dwelling over a coaxial cable 40, while the signals for the telephone and internet services arrive over a subscriber loop 42. The DSL splitter 18 is connected to the DSL modem 24 over a pair 44. Typical other equipment not shown for simplicity include digital television converters (set top boxes), and the different types of connectors and jacks associated with the different types of cables. It should be noted that the coaxial cables 38, 40, and the in-house telephone wiring 36, are typically provided when a new dwelling is built; UTP cabling is typically not included by default.

Without prejudice as to the future convergence of digital services into a single system on the service provider side, it would be desirable to minimize the need for deploying multiple wiring schemes within the dwelling to provide such services. In the case where coaxial cable distribution is already a given, it would be desirable to avoid having to add a UTP cabling distribution for the LAN. Further, it would be desirable to avoid separate physical or logical partitioning of these networks because it causes additional network management complexity driven by the multiple logical or physical networks, and multiple technologies involved.

SUMMARY OF THE INVENTION

Therefore it is an object of the present invention to provide a high speed transmission of digital signals over a coaxial cable. It is another objective of the present invention to provide a method and apparatus, which would enable a hubbed or switched Ethernet LAN to be built using existing equipment that has interfaces designed for UTP cabling, while avoiding the installation of the UTP cabling.

According to one aspect of the invention there is provided a method for transmitting forward and backward sequences of Ethernet packets, each sequence coded to be suitable for uni-directional transmission over a physical medium, between a first and a second Ethernet interface over a single coaxial cable, the method comprising the steps of:

(a) forming a backward signal from the backward coded sequence of packets at the first Ethernet interface for the transmission over the coaxial cable to the second Ethernet interface;

(b) forming a forward signal from the forward coded sequence of packets at the second Ethernet interface for the transmission over the coaxial cable to the first Ethernet interface, including providing an asymmetry in frequency or time characteristics between the forward and backward signals so that to avoid interference between the backward and forward signals and allow the transmission of both signals at the same time.

The forward and backward sequences of Ethernet packets are coded according to the one or more of the following coding schemes:

4B/5B coding; multi-level transmission encoding-3 levels (MLT-3 coding);
8B/10B coding; non-return to zero (NRZ) coding;
Pulse Amplitude Modulation (PAM) coding, including PAM level 5 coding.

Beneficially, the coaxial cable is a video coaxial cable, and the physical medium is one of the following:

unshielded twisted pair (UTP);
fiber optic cable.

Preferably, the first and second Ethernet interfaces are standard Ethernet interfaces, and the transmitting is performed in a full duplex mode.

The step (a) of the method described above comprises coupling the backward coded sequence through a passive device to the coaxial cable, e.g. through a diplexer.

According to one embodiment of the invention, the method includes the step (b) comprising the steps of:

modulating the forward coded sequence into a modulated coded signal having frequency spectrum above that of the backward coded sequence; and coupling the modulated coded signal through a passive device to the coaxial cable, e.g. through another diplexer.

Conveniently, in the method described above the backward coded sequence is a differential coded coded signal, and the step (a) comprises converting the differential coded signal into a single-ended coded signal.

The step of modulating comprises modulating the forward coded sequence, which is a differential coded signal.

In the method described above, any of the forward and backward coded sequences are one of the following signals: 100BaseT signals; 10BaseT signals; 1000Base-X signals; and 1000BaseT signals.

Preferably, the forward and backward coded sequences are 100BaseT signals or 10BaseT signals, the backward coded sequence having a spectrum limited to below about 125 MHz, and the modulated coded signal having a frequency spectrum above about 125 MHz and below about a 1250 MHz.

According to another embodiment of the invention, the backward coded sequence of Ethernet packets is a signal coded according to a format "B" having a spectrum limited to below about "X" MHz, and the forward coded sequence is a signal coded according to another format "A" having a spectrum with a lower limit above about "X" MHz, and wherein the step (a) comprises coupling the backward coded sequence through a low pass filter with an upper frequency limit of about "X" MHz and an isolator to the coaxial cable, and the step (b) comprises coupling the forward coded sequence through a high pass filter having a lower frequency limit of about "X" MHz and another isolator to the coaxial cable.

Preferably, the format "B" is 100BaseT, format "A" is 1000Base-X or 1000BaseT, and the frequency limit "X" is about 125 MHz.

According to yet another embodiment of the invention, the forward and backward sequences of Ethernet packets and interpacket gaps are sequences of coded symbols, and wherein the step (a) of the method comprises buffering "Y" coded symbols arriving at a rate "E" of the sequence of packets and sending them in blocks of "Y" symbols at a rate "Z", leaving inter block gaps of a length which depends on the rate "Z".

Preferably, the rate "Z" is more than "2E", which allows a full duplex mode transmission. Alternatively "Z" may be less than "2E", in which case a partial duplex transmission is provided.

Beneficially, the step (b) comprises buffering "Y" coded symbols arriving at a rate "E" of the sequence of packets and sending them in blocks of "Y" symbols at the same rate "Z" during said inter block gaps.

Conveniently, the forward and backward coded sequences are one of the following signals:

100BaseT signals;
10BaseT signals;
1000Base-X signals; and
100BaseT signals.

According to another aspect of the invention there is provided a system for transmitting forward and backward sequences of Ethernet packets, each sequence coded to be suitable for uni-directional transmission over a physical medium, between a first and a second Ethernet interface over a single coaxial cable, the system comprising:

(a) a means for forming a backward signal from the backward coded sequence of packets at the first Ethernet interface for the transmission over the coaxial cable to the second Ethernet interface;

(b) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time;

(c) a means for receiving the backward coded sequence from the coaxial cable and forwarding it to the second Ethernet interface;

(d) a means for receiving the forward coded sequence from the coaxial cable and forwarding it to the first Ethernet interface.

The means (a) comprises a first passive device coupling the backward signal into the coaxial cable, and the means (b) comprises:

a mixer for modulating the forward coded sequence into a modulated coded signal having frequency spectrum above that of the backward coded sequence; and a second passive device coupling the modulated coded signal to the coaxial cable.

Conveniently, in the system described above, the first and second passive devices are diplexers, the means (c) comprises said second passive device for separating the backward signal and the modulated coded signal, and the means (d) comprises said first passive device for separating the backward signal and the modulated coded signal, and a detector for converting the modulated coded signal into a copy of the forward coded sequence.

In another embodiment of the invention, the means for providing the asymmetry in frequency comprises means for coding the backward coded sequence of Ethernet according to a format "B" having a spectrum limited to below about "X" MHz, and the backward coded sequence according to another format "A" having a spectrum with a lower limit above about "X" MHz, and wherein the means (a) comprises means for coupling the backward coded sequence through a low pass filter with an upper frequency limit of about "X" MHz and an isolator to the coaxial cable, and the means (b) comprises a means for coupling the forward coded sequence through a high pass filter having a lower frequency limit of about "X" MHz and another isolator to the coaxial cable.

Preferably, in the system described above, the format "B" is 100BaseT, and format "A" is 1000Base-X or 1000BaseT, and the frequency limit "X" is about 125 MHz In yet another embodiment of the invention, the system provides the forward and backward sequences of Ethernet packets and interpacket gaps in the form of sequences of coded symbols, wherein the means (a) comprises a means for buffering "Y" coded symbols arriving at a rate "E" of the sequence of packets and sending them in blocks of "Y" symbols at a rate "Z", leaving inter block gaps of a length which depends on the rate "Z". The rate "Z" may be less than or equal to "2E", or alternatively "Z" may be more than "2E", thus providing a full duplex transmission. Preferably, the means (b) comprises a means for buffering "Y" coded symbols arriving at a rate "E" of the sequence of packets and sending them in blocks of "Y" symbols at the same rate "Z" during said inter block gaps.

Conveniently, any of the forward and backward coded sequences are one of the following signals: 100BaseT signals; 10BaseT signals; 1000Base-X signals; and 1000BaseT signals.

An Ethernet link, comprising the system described above, and a coaxial cable, wherein the means (a) and (d) are connected to the cable at one end, and the means (b) and (c) are connected to the cable at the other end is also provided.

An Ethernet network, comprising nodes and links between the nodes, where some of the links are the Ethernet links as described above can be built by using the teachings of the present invention. Conveniently, the Ethernet network is an access network, wherein the sequences of Ethernet packets carry any of the following services: video; data; voice data; voice over IP data; images.

According to one more aspect of the invention there is provided a B-type conversion device (B-type dongle) for adapting a standard Ethernet connector to a coaxial cable in a system for transmitting forward and backward sequences of Ethernet packets, each sequence coded to be suitable for uni-directional transmission over a physical medium, between a first and a second Ethernet interface over a single coaxial cable, the B-type dongle comprising:

(i) a means for forming a backward signal from the backward coded sequence of packets at the first Ethernet interface for the transmission over the coaxial cable to the second Ethernet interface; and (ii) a means for receiving a modulated coded sequence from the coaxial cable from an A-type dongle at the second Ethernet interface, demodulating the modulated coded signal into a copy of the forward coded sequence, and forwarding it to the first Ethernet interface.

The means (i) and (ii) of the B-type dongle comprise a passive device coupling the backward signal into the coaxial cable and receiving the modulated coded sequence from the coaxial cable, the passive device being, e.g. a diplexer.

According to yet another aspect of the invention there is provided an A-type conversion device (A-type dongle) for adapting a standard Ethernet connector to a coaxial cable in a system for transmitting forward and backward sequences of Ethernet packets, each sequence coded to be suitable for uni-directional transmission over a physical medium, between a first and a second Ethernet interface over a single coaxial cable, the A-type dongle comprising:

(iii) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time; and (iv) a means for receiving the backward coded sequence from the coaxial cable from a B-type dongle and forwarding it to the second Ethernet interface.

In the A-type dongle, the means for providing the asymmetry comprises a modulator for modulating the forward coded sequence into a modulated coded signal having frequency spectrum above that of the backward coded sequence and means for coupling the modulated coded signal through a passive device to the coaxial cable, e.g. through a diplexer.

According to one more aspect of the invention there is provided a B-type conversion circuit for adapting a standard Ethernet signal to a coaxial cable in a system for transmitting forward and backward sequences of Ethernet packets, each sequence coded to be suitable for uni-directional transmission over a physical medium, between a first and a second Ethernet interface over a single coaxial cable, the B-type conversion circuit comprising:

(i) a means for forming a backward signal from the backward coded sequence of packets at the first Ethernet interface for the transmission over the coaxial cable to the second Ethernet interface; and (ii) a means for receiving a modulated coded sequence from the coaxial cable from an A-type conversion circuit at the second Ethernet interface, demodulating the modulated coded signal into a copy of the forward coded sequence, and forwarding it to the first Ethernet interface.

In the B-type conversion circuit as described above, the means (i) and (ii) comprise a passive device coupling the backward signal into the coaxial cable and receiving the modulated coded sequence from the coaxial cable.

According to one more aspect of the invention there is provided an A-type conversion circuit for adapting a standard Ethernet signal to a coaxial cable in a system for transmitting forward and backward sequences of Ethernet packets, each sequence coded to be suitable for uni-directional transmission over a physical medium, between a first and a second Ethernet interface over a single coaxial cable, the A-type conversion circuit comprising:

(iii) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time; and (iv) a means for receiving the backward coded sequence from the coaxial cable from a B-type conversion circuit and forwarding it to the second Ethernet interface.

In the A-type conversion circuit described above, the means for providing the asymmetry in frequency comprises a modulator for modulating the forward coded sequence into a modulated coded signal having frequency spectrum above that of the backward coded sequence and means for coupling the modulated coded signal through a passive device to the coaxial cable.

According to yet another aspect of the invention there is provided an Ethernet link for transmitting forward and backward sequences of Ethernet packets, each sequence coded to be suitable for unidirectional transmission over a physical medium, between a first and a second Ethernet interface over a single coaxial cable, the link comprising:

a coaxial cable;

a B-type conversion circuit comprising:

(i) a means for forming a backward signal from the backward coded sequence of packets at the first Ethernet interface for the transmission over the coaxial cable to the second Ethernet interface; and (ii) a means for receiving a modulated coded sequence from the coaxial cable from an A-type conversion circuit at the second Ethernet interface, demodulating the modulated coded signal into a copy of the forward coded sequence, and forwarding it to the first Ethernet interface; and the A-type conversion circuit, comprising:

(iii) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time; and (iv) a means for receiving the backward coded sequence from the coaxial cable from the B-type conversion circuit and forwarding it to the second Ethernet interface.

An Ethernet network, comprising nodes and links between the nodes, where some of the links are the links as described above, is also provided.

Thus, method and apparatus for transmission of digital signals over a coaxial cable have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 1:
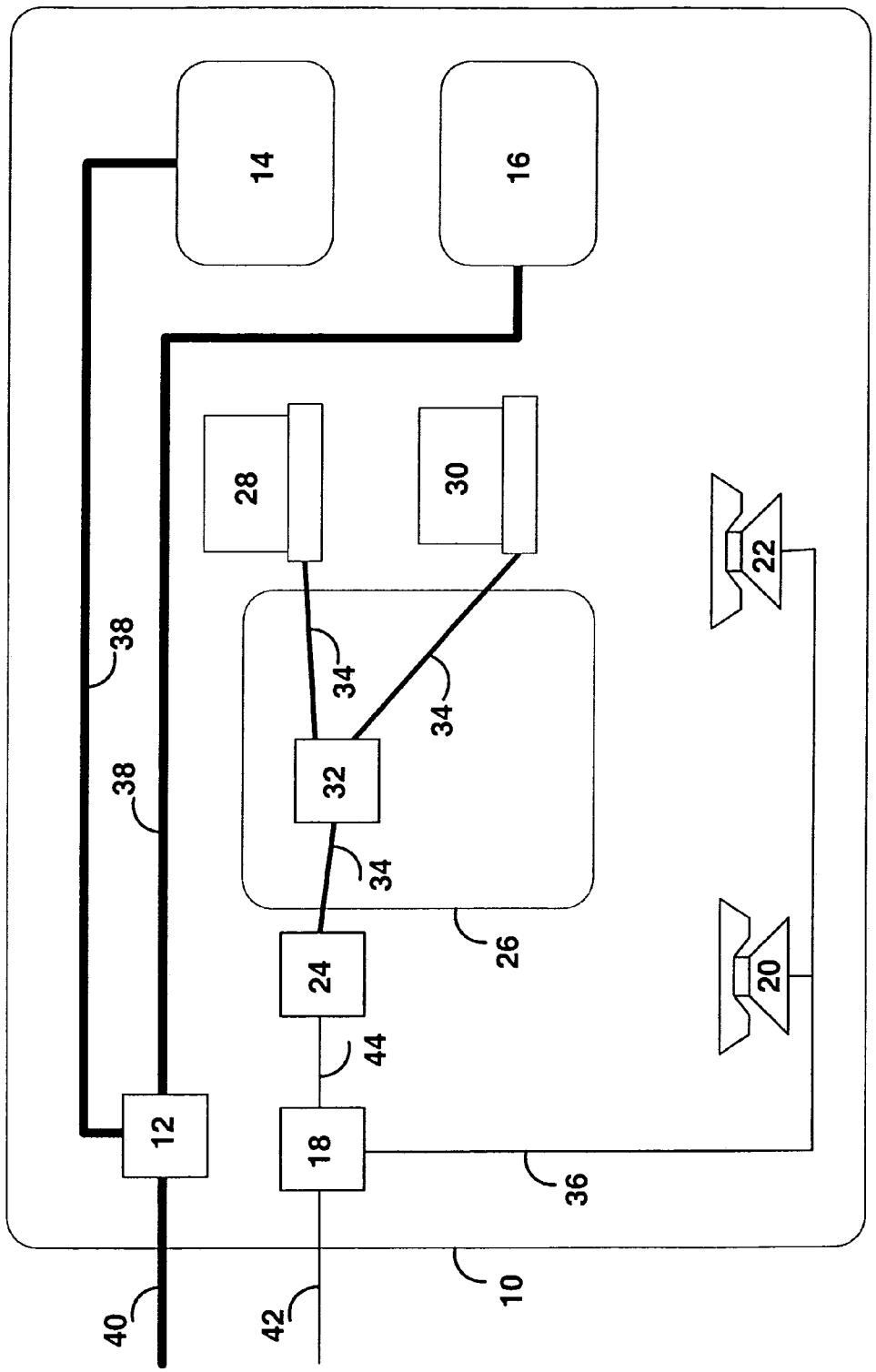
FIG. 1 illustrates a typical home wiring, providing television, telephone, and internet services, according to the prior art.
Figure 2:
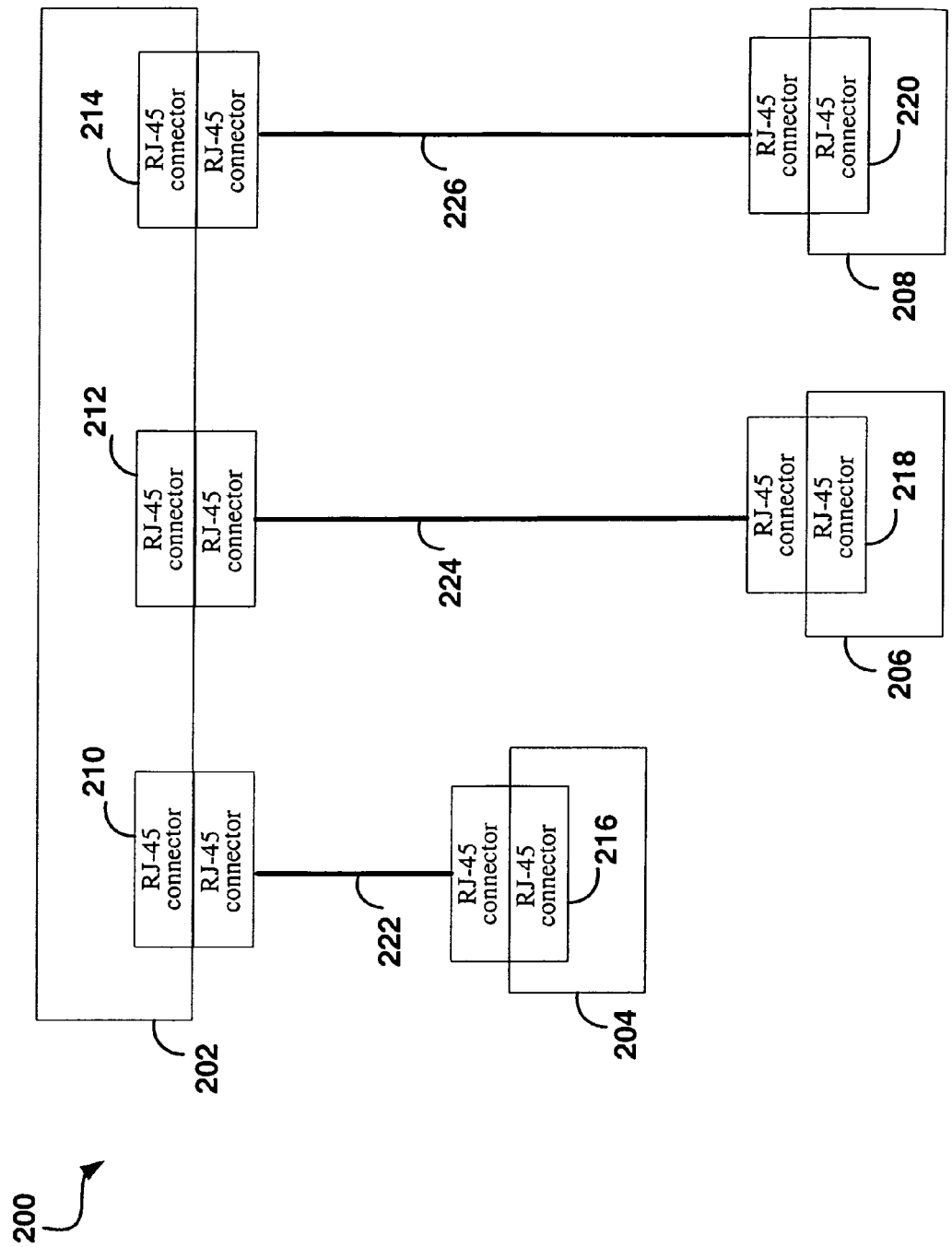
FIG. 2 illustrates an exemplary architecture of a simple home area network 200 of the prior art, based upon high-speed Ethernet on unshielded twisted pair (UTP)

In FIG. 2 is shown an exemplary architecture of a simple home area network 200 of the prior art based upon high-speed Ethernet on unshielded twisted pair (UTP). The home area network 200 comprises a layer-2 switch (or router) 202 and a number of terminal devices 204 to 208. The layer-2 switch or router 202 may be a commercially available unit, having a number of ports 210 to 214, where each port appears on the switch 202 in the form of an Electronic Industries Alliance/Telecommunications Industry Association (EIA/TIA) standard RJ-45 connector. The terminal devices 204 to 208 may also be commercially available devices, each having a corresponding data port 216 to 220, also in the form of RJ-45 connectors. Without losing generality for example, the terminal device 204 may be a DSL modem, and the terminal devices 206 and 208 may be personal computers, similar to the configuration shown in FIG. 1. The cables connecting the unit 202 with the devices 204 to 208 may be Category 5 (CAT 5) UTP cables 222 to 226 respectively, each terminated with RJ-45 connectors according to the EIA/TIA 568 standard. It will be appreciated that the simple home area network 200 constitutes a LAN, and as is the nature of LANs may be configured with switches or routers having more than three Ethernet ports, and any mix of devices including personal computers, Ethernet hubs, storage devices, to give some examples only, each device having an RJ-45 Ethernet port.

Figure 3:
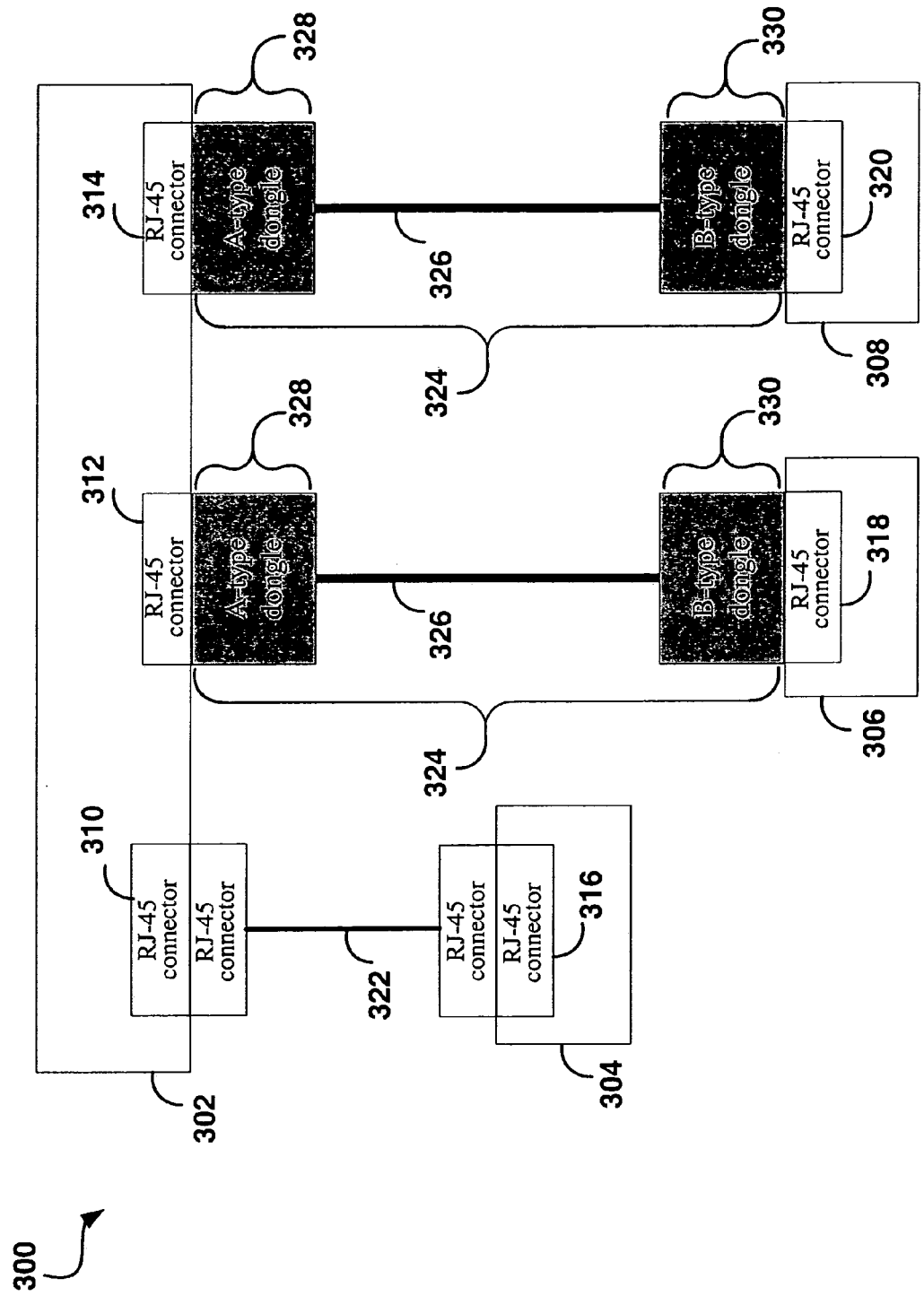
FIG. 3 illustrates a coax-based home area network 300 of the embodiment of the invention, including a coax link 324 compatible with standard RJ-45 connectors.

While the simple home area network 200 of FIG. 2 represents a typical such network of the prior art, FIG. 3 illustrates a coax-based home area network 300, similar to the network 200 but using a RJ-45 to coax conversion device according to the embodiment of the present invention, in order to take advantage of coaxial cables that may already be available, thus eliminating the need to install UTP cables in some instances, and at the same time taking advantage of RJ-45 equipped equipment that is also generally available.

In FIG. 3 is thus shown an exemplary architecture of a LAN representing a coax-based home area network 300 using high-speed Ethernet on coax. The coax-based home area network 300 comprises a layer-2 switch (or router) 302 and a number of terminal devices 304 to 308. The layer-2 switch (or router) 302 may be a commercially available unit, having a number of ports 310 to 314, where each port is physically provided in the form of an EIA/TIA standard RJ-45 connector. The terminal devices 304 to 308 may also be commercially available devices, each having a corresponding data port 316 to 320, also in the form of a RJ-45 connector. For example, the device 304 may be a DSL modem, and the devices 306 and 308 may be personal computers. Because of proximity, the cable connecting the switch 302 with the device 304 may be a short Category 5 (CAT 5) UTP patch-cable 322 terminated in RJ-45 connectors according to the EIA/TIA 568 standard. The connections between the switch 302 and the devices 306 and 308 may each be over a point-to-point full-duplex Ethernet-over-coax link 324 ("coax link" for short). Each of the coax links 324 comprises a standard coaxial cable 326 that is adapted to the EIA/TIA standard RJ-45 ports of the connecting units (302) and devices (306 and 308 respectively) with two types of RJ-45 to coax conversion devices 328 and 330. Each type-A RJ-45 to coax conversion device 328 ("A-type dongle" for short) at one end of the coaxial cables 326 is matched with a type-B RJ-45 to coax conversion device 330 ("B-type dongle" for short) at the opposite end of the respective coaxial cable 326. The A-type and B-type dongles 328 and 330 are thus used in pairs, one at each end of the coaxial cable 326, in combination to comprise a coax link 324. Implementations of the A-dongles and B-dongles 328 and 330 will be described in more detail with the help of the following Figures. Additional implementations of A-type and B-type conversion devices (conversion circuits without explicit use of RJ-45 connectors) are also presented, capable of adapting Ethernet signals for the full-duplex transmission over coaxial cable.

It will be appreciated that a LAN, as represented by the coax-based home area network 300 may be configured with switches or routers having more than three Ethernet ports, and any mix of devices including personal computers, Ethernet hubs, storage devices, and such, to give some examples only, each device having an Ethernet port, e.g. RJ-45 port.

Furthermore, Ethernet connectivity according to other standards, such as 802.11, might also be used on some ports of such a LAN, thus a variety of Ethernet links can be employed. However, the description here will be focused on the novel concept of the point-to-point full-duplex Ethernet-over-coax link 324 (the "coax link"), interfaced with RJ-45 connectors, essentially providing a functional equivalent of a CAT 5 UTP cable to be used for the transmission of Ethernet frames.

Different Ethernet speeds for use over CAT 5 and CAT 5e UTP cables have been standardized (10, 100, and 1000 Mb/s), the cables and the RJ-45 connectors being passive elements with appropriate wide frequency response. The proposed "A" and "B" type dongles 328 and 330 however are active devices, and it is anticipated that different versions will be developed to match the Ethernet speeds to be used. The initial requirement is a pair of such dongles designed for 100 Mb/s full-duplex Ethernet.

The invention is based on the characteristics of Ethernet signals according to the standards such as 100BaseT and 1000Base-X which represent the packet data and the inter-packet gaps as coded streams of symbols (coded sequences of packets). While uncoded Ethernet packets are simple binary data sequences, and as such not directly suitable for high speed transmission, the standard 100BaseT and 1000Base-X signal formats, i.e. the coding of the Ethernet packet data, were designed to be suitable for transmission over UTP cable or fiber optic links.

Figure 4:
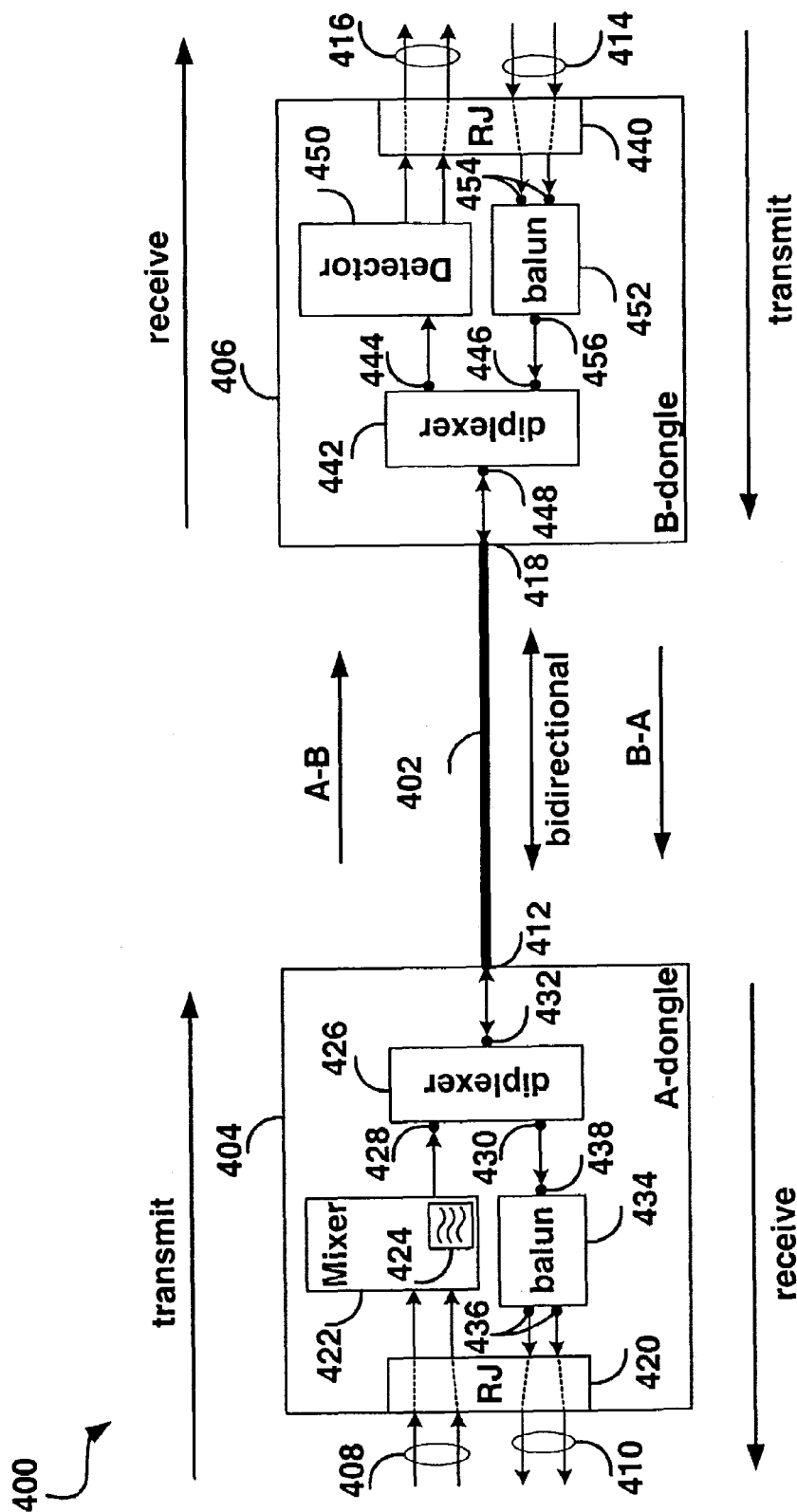
FIG. 4 shows a block diagram of an embodiment of the coax link 324 of FIG. 3 in the form of a 100 Mb/s Ethernet coax link 400, including A100-dongles 404.

Accordingly, FIG. 4 shows a block diagram of an embodiment of the coax link 324 in the form of a 100 Mb/s Ethernet coax link 400 comprising a coaxial cable 402, an A-type dongle for 100 Mb/s Ethernet ("A100-dongle" for short) 404, and a B-type dongle for 100 Mb/s Ethernet ("B100-dongle" for short) 406.

Before continuing with the description of the 100 Mb/s Ethernet coax link 400, it may be appropriate to give a theoretical background for the approach taken.

The operation of the 100 Mb/s Ethernet coax link 400 is based on two observations from past experience:

(a) the bandwidth and attenuation characteristics of the coaxial cable are suitable for base band and frequency modulated signals up to 1000 MHz or more; and (b) the spectrum of a standard base band Ethernet signal of 100 Mb/s (100BaseT) is limited by virtue of the 4B5B and MLT-3 coding used, with energy centered around 33 MHz and limited to frequencies below about 100 MHz.

As a consequence of these physical properties, it is possible to transmit two 100 Mb/s (100BaseT) Ethernet signals over a single coaxial cable: One Ethernet 100BaseT signal (a backward coded sequence) is transmitted essentially unmodified, thus occupying a low frequency spectrum, in one direction, i.e. from a B-dongle to an A-dongle. The other Ethernet 100BaseT signal (a forward coded sequence) may then be modulated (up-converted) and transmitted within some higher frequency spectrum in the other direction in the form of a modulated coded signal, from the A-dongle to the B-dongle, without significant interference between the two signals on the coaxial cable.

Figure 5:
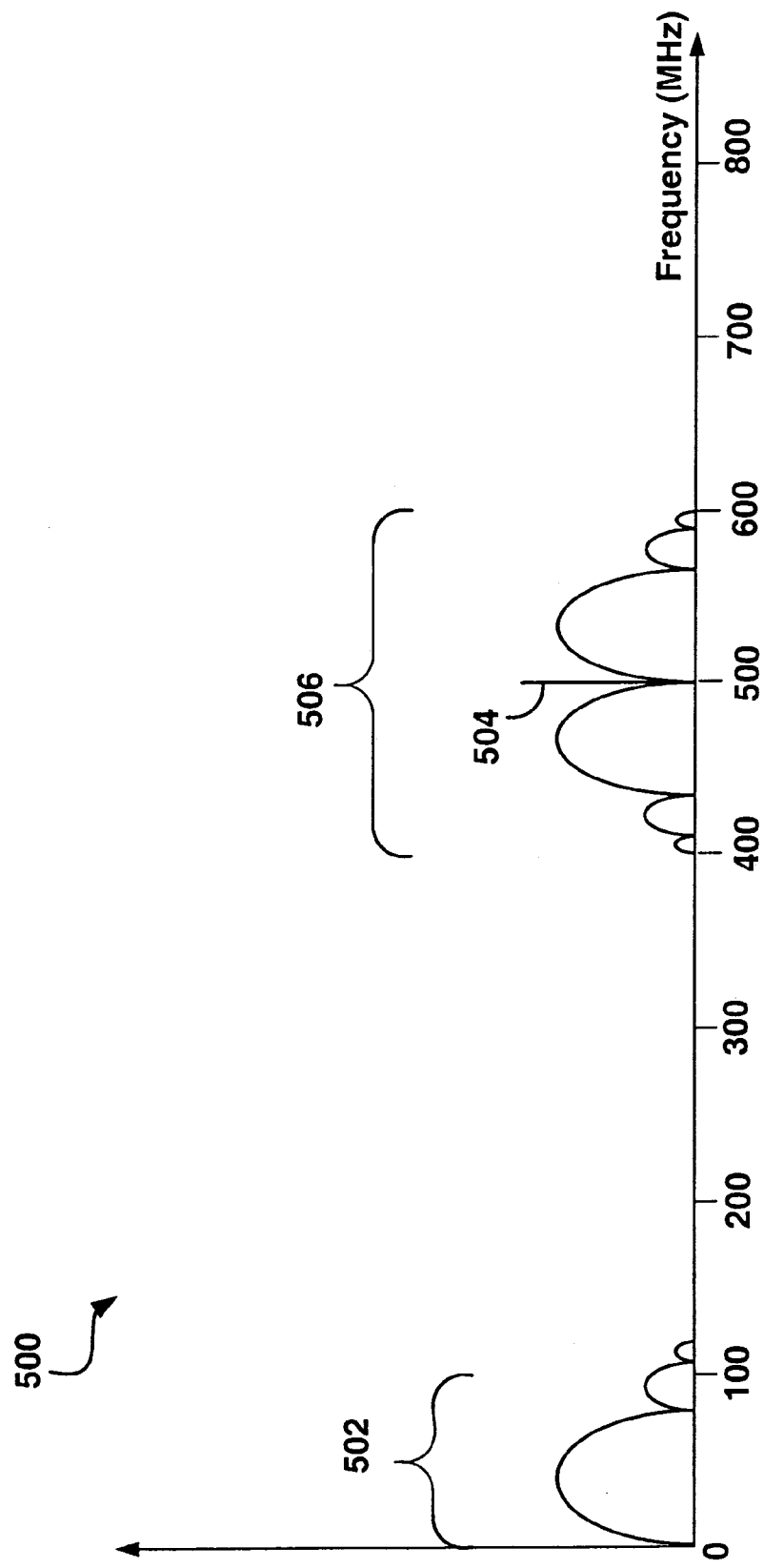
FIG. 5 shows a qualitative spectral density diagram 500 of the Ethernet coax link 400 of FIG. 4.

This is illustrated in FIG. 5 which shows a qualitative spectral density diagram 500. The diagram 500 covers a frequency range from 0 to about 800 MHz. Coaxial cable, such as RG59 or RG6 video cable that is commonly installed in dwellings to distribute cable television (CATV) signals, has good transmission characteristics in this frequency range. The spectral density diagram 500 shows two spectra, a 100BaseT base band spectrum 502, representing approximately the spectrum of a base band 100 Mb/s (EEE standard 803, 100BaseT) Ethernet signal that is MLT-3 encoded as specified in the standard; a carrier frequency 504, with a frequency of 500 MHz; and an amplitude modulated Ethernet spectrum 506, representing approximately the spectrum of a 100 Mb/s (100BaseT) Ethernet signal after amplitude modulation with the 500 MHz carrier frequency 504. The base band spectrum 502 occupies the range from just above 0 Hz to about 100 MHz. The 100BaseT Ethernet signal is thus a band limited signal with an upper frequency limit of about 100 MHz. The amplitude modulated Ethernet spectrum 506 ranges from about 400 to about 600 MHz. While the spectrum 506 shown here is that which results from simple amplitude modulation, corresponding to the preferred embodiment, it would be obvious to persons skilled in the art that other modulation methods could be employed in order to up-convert, or shift, the spectrum of a 100 Mb/s Ethernet signal into a range above the upper limit of the (unmodulated) 100BaseT base band spectrum 502. The carrier frequency 504 (500 MHz) was arbitrarily chosen because it is sufficiently high to avoid interference (crosstalk) between the base-band and the modulated signals, with very simple filters or even without filters, while being sufficiently low to generate a modulated spectrum 506 that is well within the transmission range of conventional coaxial video cables. A different carrier frequency may be selected within the scope of the invention. In contrast to more bandwidth-efficient modulation methods such as would be necessary for transporting many digital channels over a digital cable system or a hybrid fiber coax (HFC) network, the much less bandwidth-efficient method and also much simpler method of direct amplitude modulation of a high frequency carrier with a 100BaseT signal is suitable here. The simplification arises because only a single 100 Mb/s signal needs to be modulated and carried over the coaxial cable, in addition to the relatively narrow frequency base band signal.

We return now to FIG. 4, which shows further details of the 100 Mb/s Ethernet coax link 400. Overall, the A100-dongle 404 provides, an Ethernet 100BaseT input 408, an Ethernet 100BaseT output 410, and a bidirectional coax input/output 412. Similarly the B100-dongle 406 provides, an Ethernet 100BaseT input 414, an Ethernet 100BaseT output 416, and a bidirectional coax input/output 418. The bidirectional coax input/output 412 and 418 may include any of a number of standard coax connectors, for example an "F-type" coax connector. Alternatively, the A100-dongle 404 and the B100-dongle 406 may be attached directly to the coaxial cable 402.

Functionally, the 100 Mb/s Ethernet coax link 400 provides a 100 Mb/s transmission path from the Ethernet 100BaseT input 408 on the A100-dongle 404, via the bidirectional coax input/output 412 on the A100-dongle 404, the coaxial cable 402, and the bidirectional coax input/output 418 on the B100-dongle 406, to the Ethernet 100BaseT output 416 on the B100-dongle 406. Similarly, in the opposite direction, a 100 Mb/s transmission path from the Ethernet 100BaseT input 414 on the B100-dongle 406, via the bidirectional coax input/output 418 on the B100-dongle 406, the coaxial cable 402, and the bidirectional coax input/output 412 on the A100-dongle 404, to the Ethernet 100BaseT output 410 on the A100-dongle 404, is provided.

A100-dongle 404

The A100-dongle 404 comprises a standard RJ-45 connector 420; an up-converter (or mixer) 422 having a local oscillator 424; a diplexer 426 having a high-pass input 428, a low-pass output 430, and a bidirectional terminal 432; and a balun 434 having balanced terminals 436 and an unbalanced terminal 438.

The RJ-45 connector 420 provides physical compatibility with other standard Ethernet equipment, specifically a RJ-45 connector, for example the RJ-45 connector 312 of the coax-based home area network 300 in FIG. 3. Mixers, diplexers, and baluns are devices familiar to people skilled in radio-frequency design, mixers generally being active circuits while diplexers and baluns are passive devices.

The input of the mixer 422 is connected through the standard RJ-45 connector 420 to the Ethernet 100BaseT input 408 of the A100-dongle 404.

The output of the mixer 422 is connected to the high-pass input 428 of the diplexer 426. The bidirectional terminal 432 of the diplexer 426 is connected with the bidirectional coax input/output 412 of the A100-dongle 404. The low-pass output 430 of the diplexer 426 is connected to the unbalanced terminal 438 of the balun 434.

The balanced terminals 436 of the balun 434 are connected through the standard RJ-45 connector 420 to the Ethernet 100BaseT output 410 of the A100-dongle 404.

In functional terms, the A100-dongle 404 provides two 100 Mb/s Ethernet transmission paths, one from the Ethernet 100BaseT input 408 to the bidirectional coax input/output 412 (constituting the transmit direction of the A100-dongle 404), the other path in the reverse direction from the bidirectional coax input/output 412 to the Ethernet 100BaseT output 410 (the receive direction of the A100-dongle 404).

In the transmit direction of the A100-dongle 404, the 100BaseT signal received at the Ethernet 100BaseT input 408 is up-converted in the mixer 422 using the local oscillator 424. The frequency of the local oscillator 424 is preferably on the order of 500 MHz selected to avoid spectral overlap while minimizing filtering requirements. The function of the mixer is equivalent to modulating the amplitude of the local oscillator 424 with the waveform of the base band (100BaseT) Ethernet signal, which is a 4B5B and MLT-3 coded binary signal. The output of the mixer 422, containing the modulated (up-converted) signal is connected through the diplexer 426 to the coaxial cable 402. The path through the diplexer 426 from its high-pass input 428 to its bidirectional terminal 432 includes a simple high-pass filter which serves to attenuate any low-frequency (base band) components of the signal that may be leaking through the mixer 422. This allows for a very low-cost implementation of the mixer 422.

The signal received at the bidirectional coax input/output 412 from the far end (i.e. from the B100-dongle 406) over the coaxial cable 402 contains the base band Ethernet signal transmitted from the far end. This base band signal is separated and low-pass filtered by the diplexer 426 and passed through the balun 434 (changed from single-ended to differential and to resolve any impedance mismatches) directly to the Ethernet 100BaseT output 410. In the receive direction, the path through the A100-dongle 404 is thus entirely passive.

B100-dongle 406

The B 100-dongle 406 is complementary to the A100-dongle 404, and contains a number of corresponding components.

The B100-dongle 406 comprises a standard RJ-45 connector 440 (corresponding to the standard RJ-45 connector 420 of the A100-dongle 404);

a diplexer 442 (corresponding to the diplexer 426 of the A100-dongle 404) having a high-pass output 444, a low-pass input 446, and a bidirectional terminal 448;

a down-converter (or detector) 450 (corresponding to the up-converter or mixer 422 of the A100-dongle 404); and a balun 452 (corresponding to the balun 434 of the A100-dongle 404) having balanced terminals 454 and an unbalanced terminal 456.

RJ-connectors, diplexers, and baluns are normally inherently passive, bidirectional devices. Accordingly the same type of component may be used in both the A100-dongle and the B100-dongle. Detectors, diplexers, and baluns are devices familiar to people skilled in radio-frequency design.

The bidirectional coax input/output 418 of the B100-dongle 406 is connected to the bidirectional terminal 448 of the diplexer 442. The high-pass output of the diplexer 442 is connected to the input of the detector 450. The output of the detector 450 is connected through the standard RJ-45 connector 440 to the Ethernet 100BaseT output 416 of the B100-dongle 406.

The low-pass input 446 of the diplexer 442 is connected to the unbalanced terminal 456 of the balun 452.

The balanced terminals 454 of the balun 452 are connected through the standard RJ-45 connector 440 with the Ethernet 100BaseT input 414 of the B100-dongle 406.

The RJ-45 connector 440 provides physical compatibility with other standard Ethernet equipment, specifically a RJ-45 connector, for example the RJ-45 connector 306 of the coax-based home area network 300 in FIG. 3.

In functional terms, the B100-dongle 404 provides two 100 Mb/s Ethernet transmission paths, one from the Ethernet 100BaseT input 414 to the bidirectional coax input/output 418 (the transmit direction of the B100-dongle 406), the other path in the reverse direction from the bidirectional coax input/output 418 to the Ethernet 100BaseT output 416 (the receive direction of the B100-dongle 404).

In the transmit direction of the B100-dongle 406, the 100BaseT signal received at the Ethernet 100BaseT input 414 is passed through the RJ-connector 440 to the balanced (differential) input 454 of the balun 452 which changes the signal from differential to unbalanced (single-ended). The signal then passes from the unbalanced output 456 of the balun 452 to the low-pass input 446 of the diplexer 442, and passes through the diplexer 442 and its bidirectional terminal 448 to the bidirectional coax input/output 418 of the B100-dongle 406. The signal thus passes through the B100-dongle 406 in the transmit direction essentially unchanged in frequency content, and is merely changed from a balanced signal to an unbalanced signal, and matched to the impedance of the coaxial cable 402.

It should be noted that the diplexers 426 (of the A100-dongle 404) and 442 (of the B100-dongle 406) are designed to separate/combine a low-frequency signal (a base band 100 Mb/s Ethernet signal) and an up-converted or modulated 100 Mb/s Ethernet signal with a signal spectrum around 500 MHz, while satisfying impedance matching requirements on all its terminals, as is conventional in the design of diplexers. Compared with conventional 2-wire/4-wire hybrids that have no frequency selectivity, diplexers provide a lower transmission loss within their designed pass bands.

In the receive direction of the B100-dongle 406, the signal arriving over the coaxial cable 402 at the bidirectional coax input/output 418 is passed through the diplexer 442 from its bidirectional terminal 448 to its high-pass output 444, and onward to the detector 450. The signal received at the input of the detector 450 is the modulated signal from the mixer 422 in the far-end A100-dongle 404. In the preferred embodiment, this signal is an amplitude modulated (envelope modulated) signal which can be decoded by a simple AM (amplitude modulation) detector, such as a rectifier, or a peak detector, followed by a low pass filter to remove the high frequency components; and an AC-coupling to remove any DC component in the signal. Optionally, and in order to increase sensitivity, the detector 450 may employ amplification as well as other more sophisticated techniques, such as heterodyning or autodyning. These techniques are familiar to persons engaged in radio receiver design. Theoretically there is no need for additional amplification if only a short coaxial cable is employed, as the mixer 422 could provide a sufficiently large signal. But practically to minimize power dissipation at the transmit end, and to compensate for loss in the diplexers 426 and 442, and the detector 450, additional amplification may be required.

The output of the detector 450 is a differential signal that is sent to the Ethernet 100BaseT output 416 via the standard RJ-45 connector 440, the differential signal being essentially a copy of the forward coded sequence at the Ethernet 100BaseT input 408 of the A100-dongle 404.

In summary, the 100 Mb/s Ethernet coax link 400 thus provides both directions of transmission of a 100 Mb/s Ethernet signal between standard RJ-45 connectors over the coaxial cable 402. The signal in the backward direction (the direction B to A, from the Ethernet 100BaseT input 414 at the B100-dongle 406 to the Ethernet 100BaseT output 410 at the A100-dongle 404) is carried over the coaxial cable 402 in its base band form. The signal in the forward direction (the direction A to B, from the Ethernet 100BaseT input 408 at the A100-dongle 404 to the Ethernet 100BaseT output 416 at the B100-dongle 406) is carried over the coaxial cable 402 in modulated form occupying a spectrum around 500 MHz (spectrum 506 in FIG. 5). The two signals do not interfere with one another because of the spectrum difference that results from the modulation with a high frequency of one of the signals, and because of the use of diplexers at each end of the common coax path to separate and combine the two signals according to their different frequency spectra. A first passive device (the diplexer 442) in the B100-dongle 406 is used to couple the unmodulated backward signal (from B to A) to the coaxial cable 402 at the bidirectional coax input/output 418 while receiving the forward modulated signal from the coaxial cable 402. A second passive device (the diplexer 426) in the A100-dongle 404 is used to couple the modulated forward signal (from A to B) to the coaxial cable 402 at the bidirectional coax input/output 412 while receiving the backward unmodulated signal from the coaxial cable 402.

The embodiment of a coax link 324 such as the 100 Mb/s Ethernet coax link 400 shown in FIG. 4 has been described with particular reference to 100 Mb/s Ethernet. It is understood that in standard Ethernet usage, a higher speed Ethernet link should be compatible with lower speed Ethernet signals as well. For example, equipment such as switches and routers may operate in a mixed mode where ports that run at 100 Mb/s are implicitly also capable of running at the lower standard 10 Mb/s rate (10BaseT). A simple CAT 5 UTP cable terminated with RJ-45 connectors will be compatible with Ethernet signals at either speed. The 100 Mb/s Ethernet coax link 400 shown in FIG. 4 is intended to emulate a connectorized CAT 5 UTP cable, and is thus also capable of transmitting at 10 Mb/s if minor modifications are made in the mixer 422. The difference between 10BaseT and 100BaseT Ethernet signals is not only the rate of transmission but also the coding. As mentioned above, the 100BaseT signal is a binary signal, 4B5B and MLT-3 encoded, i.e. containing a sequence of zeros and plus-ones and minus-ones, with frequent transitions between the two states. The 10BaseT signal on the other hand is encoded with alternate mark inversion (AMI), having three states: zero, plus-one, and minus-one. This waveform can also be used to amplitude-modulate a high-frequency carrier, as long as an appropriate DC-bias (to represent the zero-state of the 10BaseT Ethernet signal) is provided in the mixer 422. Persons skilled in the art of radio frequency modulator or mixer design are familiar with circuit techniques to accomplish this without undue costliness. No modifications are needed in the design of the detector 450, that is designed to demodulate an amplitude modulated signal. The design of a symmetrical 100 MB/s Ethernet-over-coax link has been presented in the preceding. Even though two different instances of dongles (A-type and B-type) are required to provide an asymmetry in frequency characteristics between the forward and backward signals on the coaxial cable, the 100 MB/s Ethernet-over-coax link is symmetrical in terms of usage, providing simultaneous 100 Mb/s transmission in either direction. The 100 Mb/s Ethernet-over-coax link is also symmetrical in terms of protocols, and can be used for full-duplex data communication in the same way as a twisted pair cable, terminated in RJ-45 connectors. In summary, the embodiment of the symmetrical Ethernet-over-coax link described above, relies on the concept of transmitting the base band signal, being a band limited signal essentially unmodified, over the coaxial cable in one direction (the backward direction), while transmitting a modulated (or frequency shifted) version of the return signal in the other direction (the forward direction). The modulation carrier is selected so that the modulated (or frequency shifted) signal occupies a frequency spectrum above the upper frequency cutoff of the base band signal. In the case of 100BaseT, and the application of standard CATV coaxial cable, there is sufficient coaxial bandwidth available to permit the use of a very simple modulation method (amplitude modulation) where the modulated signal occupies approximately twice the bandwidth as the unmodulated signal (see FIG. 5). More spectrum-efficient, but also generally more complex modulation methods may be used to conserve bandwidth if necessary.

In a variation of the embodiment of the invention, a single sideband method of modulation may be used to reduce the bandwidth occupied by the modulated signal, and in yet another variation, a double sideband modulation with carrier suppression may be used. Both these methods and other methods not enumerated may be used to improve the efficiency of transmission over coaxial cable, at the expense of more complex modulators and detectors (demodulators) and may be suitable for the design of a full duplex 1000 Mb/s coax link that is analogous to the 100 Mb/s Ethernet coax link 400, but provides emulation of a 1000BaseT (or 1000Base-X) link.

Although the invention has been described in an application to provide bidirectional 100BaseT Ethernet transmission over a coaxial cable, it is contemplated that modifications may be made to provide bidirectional transmission over coaxial cable of other signals, for example higher speed Ethernet signals (Gigabit Ethernet) as mentioned before, or data signals of other protocols such as "ANSI Standard Fiber Channel" that are often used in storage networks.

Not shown in the diagram of FIG. 4, are means to supply power to the active circuits of the A100-dongle 404 and the B100-dongle 406. A number of possibilities would occur to persons who are experienced in electronic circuit or system design. Power may for instance be provided from an external power supply. Another possibility is to supply power to one of the dongles over the coaxial cable from the other dongle. Such techniques are common in the cable TV (CATV) industry. In the case of embedded interfaces (see below), the provision of power to the circuit is not an issue.

Embedded Interfaces

In the preceding, a symmetrical 100 MB/s Ethernet-over-coax link has been presented with standard connectors (RJ-45) at each end. There is also a possibility of avoiding the use of a dongle to convert between a twisted pair connector and the coaxial cable.

Figure 6:
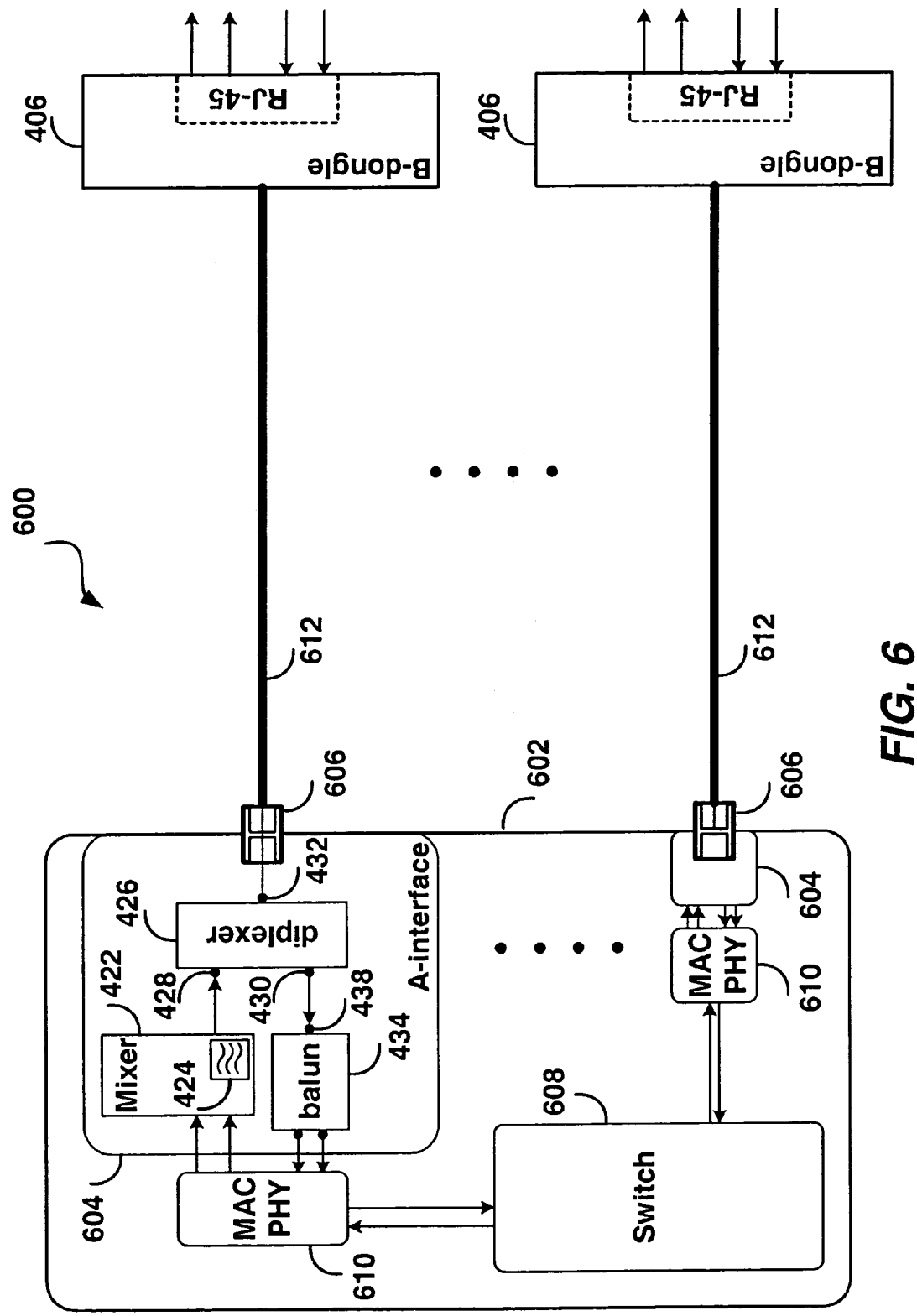
FIG. 6 shows an arrangement 600 where components of the A100-dongle 404 of FIG. 4 are mounted directly (embedded) in a coax-terminated Ethernet switch (or router) 602.

In FIG. 6 is shown an arrangement 600 where components of the A100-dongle 404 are mounted directly (embedded) in a coax-terminated Ethernet switch (or router) 602.

The coax-terminated Ethernet switch (or router) 602 comprises one or more A100-interface modules 604 and one or more corresponding coax connectors 606. One of the A100-interface modules 604 is shown in detail, comprising the same components and circuitry as the A100-dongle 404, but without the RJ-45 connector 420. Each A100-interface module 604 is associated with one of the coax connectors 606.

The coax-terminated Ethernet switch (or router) 602 further comprises a switch logic circuit 608, and one or more Ethernet MAC/PHY circuits 610 corresponding to each of the A100-interface modules 604, the term MAC/PHY standing for "Media Access Control/Physical interface".

Further shown within the arrangement 600 are coaxial cables 612 connected to B100-dongles 406 (as described in detail above) at the far end. The coax-terminated Ethernet switch (or router) 602 may comprise additional components, not shown, such as microprocessor, memory devices, and other types of interfaces in addition to the A 100-interface modules 604.

The switch logic circuit 608 is connected to the one or more Ethernet MAC/PHY circuits 610 which may be standard components, or may be integrated with the switch logic circuit 608. Each of the one or more Ethernet MAC/PHY circuits 610 comprises a standard 100BaseT interface by which it is connected to the corresponding A100-interface module 604.

The functionality of the arrangement 600 is similar to that of the coax-based home area network 300 of FIG. 3.

In the arrangement 600, the circuitry of an A-type dongle is embedded in each interface module 604. As a result, a B-type dongle (B100-dongle 406) is used to terminate each coaxial cable 612 that is connected to the coax-terminated Ethernet switch (or router) 602.

A similar arrangement (not shown) may be created in which the circuitry of a B-type dongle (such as the B100-dongle 406, but without the RJ-45 connector) is embedded in interface modules of a switch or router. As a result, A-type dongles (A100-dongle 404) would be used to terminate each coaxial cable that is connected to the coax-terminated Ethernet switch (or router) 602.

Second Embodiment

Figure 7:
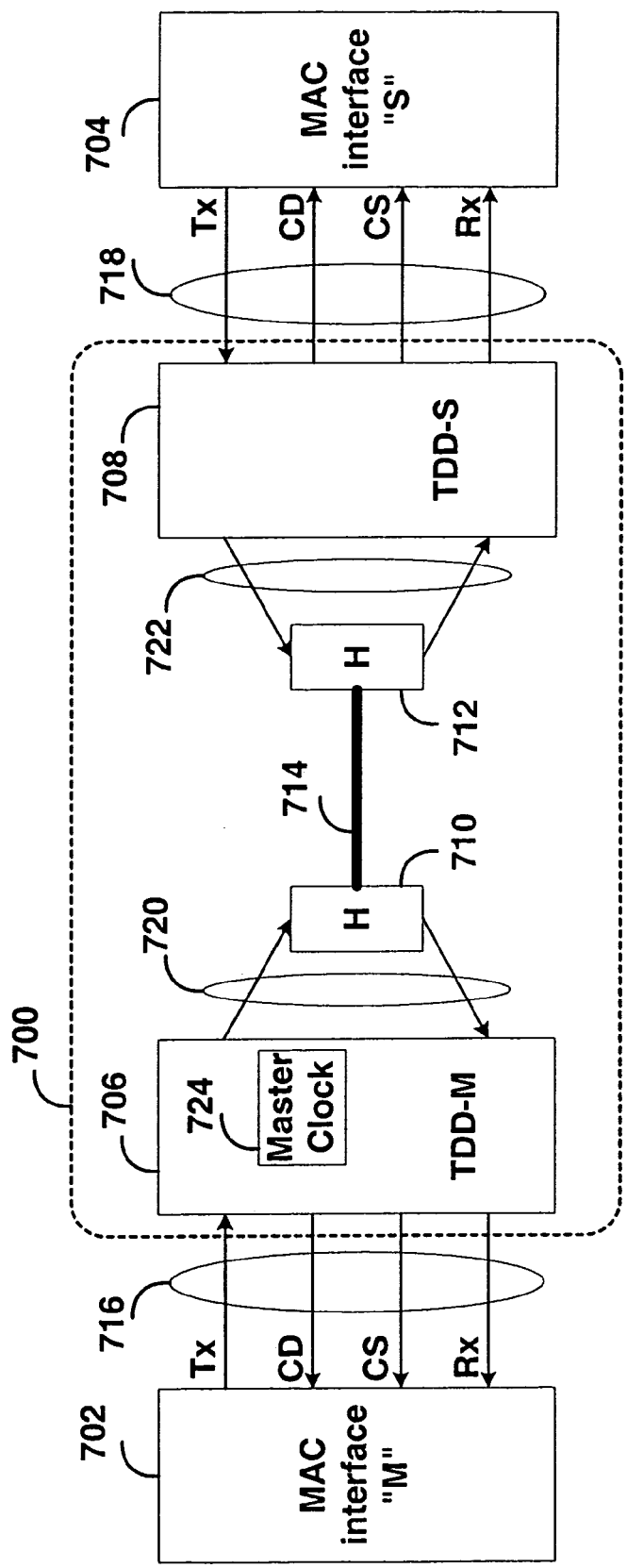
FIG. 7 shows a high level diagram of a second embodiment of a full duplex Ethernet link over coax, in the form of a Time Division Duplexing (TDD) Ethernet link 700.
Figure 8:
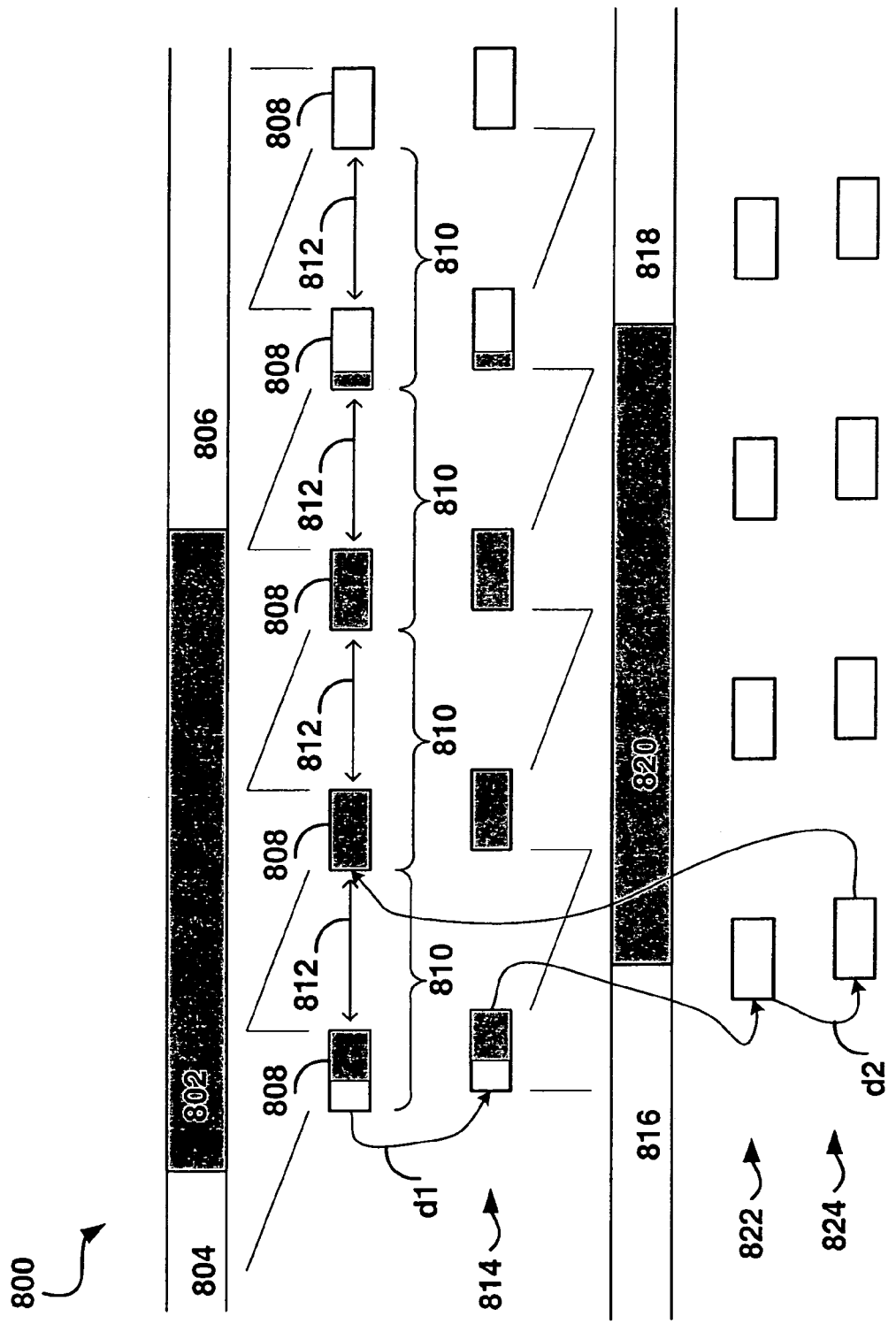
FIG. 8 shows a partial timing diagram 800 of the TDD link 700 of FIG. 7.

Another method for providing full-duplex transmission of 100BaseT Ethernet signals over a single coaxial cable is illustrated with a high-level block diagram in FIG. 7 and a simple timing chart in FIG. 8.

The diagram of FIG. 7 illustrates a second embodiment of a full duplex Ethernet link over coax, in the form of a Time Division Duplexing (TDD) Ethernet link 700 ("TDD link" for short). Shown in FIG. 7 are also two standard Ethernet MAC interfaces, interface "M" 702 and interface "S" 704. The TDD link 700 comprises two TDD adapters, a TDD M-adapter 706 and a TDD S-adapter 708 linked through hybrids 710 and 712 a coaxial cable 714. The TDD M-adapter 706 is connected to the interface "M" 702 by a signal group 716, comprising four signals "Rx", "Tx", "Collision Detection", and "Carrier Sense". Similarly, the TDD S-adapter 708 is connected to the interface "S" 704 by an equivalent signal group 718. The hybrids 710 and 712 couple four-wire signals 720 (ground signals are not shown) of the TDD M-adapter 706, and four-wire signals 722 of the TDD S-adapter 708, respectively, to the two-wire coaxial cable 714 in the conventional manner. The hybrids are passive devices and provide impedance termination for the coaxial cable while combining and separating the signals to and from the TDD adapters in the known manner of 2-wire to 4-wire hybrids, with minimal or no frequency distortion. However, the hybrids provide attenuation of side tones (near end echo), and impedance matching to attenuate the far end echo. The hybrids 710 an 712 are similar to the diplexers 426 and 442 (FIG. 4), but without frequency dependent operation. In other words, unlike the diplexers, the hybrids do not provide high- and low-pass ports, but are designed to operate over the whole frequency range of interest (the bandwidth of the signal transmitted over the coaxial cable 714).

The signals "Rx", "Tx", "Collision Detection", and "Carrier Sense" are commonly used in Ethernet interface devices, and their operation is described in the IEEE Ethernet standard 802.3. Briefly, in CSMA/CD (Carrier Sense Multiple Access/

Collision Detection) versions of the Ethernet standard, a first station may start transmitting a packet if no carrier is sensed on the medium (e.g. the wires connecting the stations), i.e. no other station is transmitting. However there is a (usually) small probability that a second station may have begun transmitting at the same time, or within a very short time because of signal delays, without being sensed by the first station. In that case, the transmitted and received signals at each station will differ, indicating a "collision", and both stations will "back off" and try retransmitting their packet later. Logic circuitry attached to the medium senses the signal and detects collisions, thus generating the "Collision Detection", and "Carrier Sense" signals as appropriate.

By definition, an Ethernet link employing CSMA/CD, even if no more than two stations are involved, is a half-duplex link. In a multi-link system, such as an Ethernet switch with 100BaseT interfaces, all links are normally full-duplex links. In such a system, there are no collisions on a link. Collision detection (and carrier sense) are simulated on each link between the hub and a connected node in order to regulate the traffic flow between end nodes (i.e. the nodes connected to the hub). Whenever a node is unable to accept a packet due to buffering constraints, it is then able to temporarily halt the packet flow by simulating a carrier sense or a collision situation.

To avoid possible confusion, let us state that collision detection (and carrier sense) play no role in the time-division protocol described below (see timing diagram, FIG. 8).

It is preferred to provide a full-duplex Ethernet link functionality over the coaxial cable 710 using a time division duplexing method. To be truly "full-duplex", both interfaces "M" 702 and "S" 704 must be able to independently and simultaneously transmit and receive Ethernet frames at their designed speed (e.g. 100 Mb/s) over the link 700.

The solution is based on a time-division protocol running at a higher physical link rate (super-rate "Z"), where the super-rate "Z" is greater than the sum of the Ethernet rates in each direction. For example, to provide a full-duplex link for 100 Mb/s Ethernet, each with a coded symbol rate "E" of 125 MBaud, a super-rate "Z" of 300 Mb/s or more could be used. One of the TDD adapters, e.g. the TDD M-adapter 706 connected to the interface "M" 702, comprises a master clock 724 and transmits a repetitive digital signal composed of short blocks of bits. Each block of bits is termed a "cell". Each cell could be in the nature of an ATM cell or a similar structure comprising a header and a data portion. However, when coded (e.g. 4B5B coded) Ethernet signals are transmitted, no cell overhead is required for segmenting the packet data. Rather, blocks of raw 4B5B code words may be sampled and reconstructed at the far end. Note that the symbol rate (Baud rate) of 4B5B coded 100BaseT Ethernet signals is 125 MHz (62.5 MBaud). It is understood that cell could be an entire Ethernet packet, and that segmentation of a frame/packet to multiple cells is not mandatory.

FIG. 8 shows a partial timing diagram 800 illustrating the transmission of a packet from the interface "M" 702 to the interface "S" 704 in FIG. 7. A packet 802 (shown in gray) is transmitted in the form of 4B5B code words on the "Tx" signal of the signal group 716. Idle periods before and after this packet 802 are indicated as idle code periods (interpacket gaps) 804 and 806 respectively. The bit rate of the "Tx" signal may be 125 Mb/s. In the TDD-M adapter 706, the "Tx" signal is received into a small FIFO buffer (not shown) and transmitted at the rate determined by the master clock 724 in a sequence of cell time slots 810 comprising cells 808, interspersed with inter block gaps 812. Each cell 808 comprises "Y" symbols, a symbol being a code word. The cells 808 are transmitted through the hybrid 710 into the coaxial cable 714 (FIG. 7). The bit rate of the cell transmission may be 375 MHz, i.e. about three (3) times faster than the bit rate of the transmitted packets 802 and of the signal of the idle code periods 804 and 806 (the "Tx" signal).

The signal from the interface "M" 702 ("Tx" signal) is thus sampled (segmented) continuously, such that each cell 808 includes as many bits from the "Tx" signal as have arrived since the last cell time slot, regardless whether these are idle code bits (806 or 808), or coded packet bits. In this way, the TDD adapter does not need to recognize and delineate Ethernet packets (as it would if standard ATM segmentation such as AAL5 were used). Each cell 808 thus comprises a number of bits (in "Y" code words) from the "Tx" signal, compressed in time, for transmission over the coaxial cable 714, while leaving inter block gaps 812. The choice of values for the super-rate "Z" and the number of symbols "Y" in each cell 808, may be made after considering the length of the coaxial cable in terms of delay, the delay introduced by the small FIFO buffer, together with the incrementally higher cost of selecting a higher super-rate "Z".

The cells 808 are transmitted over the coaxial cable 714 from the hybrid 710 (FIG. 7) and arrive at the distant hybrid 712 after a propagation delay "d1" that is determined by the length of the coaxial cable 714, in the form of a delayed forward cell stream 814 (FIG. 8). The cells of the delayed forward cell stream 814 are shown slightly displaced to the right relative to the cells 808, to indicate the delay "d1".

The cell stream 814 passes through the distant hybrid 712 (FIG. 7) to arrive at the TDD S-adapter 708. In the TDD S-adapter 708, idle code periods 816 and 818, and a packet 820 are generated by expanding in time the cells of the delayed forward cell stream 814. The resulting signal (the idle code periods 816 and 818, and the packet 820) are forwarded to the interface "S" 704 over the "Rx" signal in the signal group 718. In the absence of transmission errors, the idle code periods 816 and 818, and the packet 820 are exact replicas of the idle code periods 804 and 806, and the packet 802, however delayed in time by approximately the duration of a cell time slot 810.

The TDD S-adapter 708 at the receiving end of the link thus converts the received cells into complete packets and idle periods in real time using a small buffer (not shown).

In the opposite direction, the TDD S-adapter 708, connected to the interface "S" 704 converts packets received on the "Tx" signal of the signal group 718 into cells in a similar manner. However, the clock (not shown) in the TDD S-adapter 708 is slaved to the master clock 724 in the TDD M-adapter 706, using any one of a number of well-known techniques to achieve clock synchronization. The cell time slots in the two directions are also synchronized, cells and gaps alternating, such that cells in one direction appear on the coaxial cable during the gaps in the other direction. Although the hybrids 710 and 712 (FIG. 7) serve to separate the signals flowing in the two directions on the coaxial cable 714, they may do so imperfectly, and it is desirable that cells traveling in opposite direction do not overlap in order to simplify the receive circuits in the TDD adapters 706 and 708. The length of each cell time slot 810 and the length of the inter block gaps 812 could be fixed to allow for the longest propagation delay "d1" that could be expected. The super-rate "Z" (the rate of the master clock 724) must be at least equal to the ratio of the length of the inter block gaps 812 to the length of the cell 808, multiplied by the bit rate of the coded Ethernet signal to be carried.

The diagram of FIG. 8 illustrates the cell interleaving by showing a backward cell stream 822 and a delayed backward cell stream 824. The backward cell stream 822 comprises the cells sent out by the TDD S-adapter 708 over the hybrid 712 towards the TDD M-adapter 706, immediately after the complete reception of each cell of the delayed forward cell stream 814. This is indicated in the diagram (FIG. 8) by a line pointing from the end of a cell in the delayed forward cell stream 814 to the beginning of a corresponding cell in backward cell stream 822. The cells of the backward cell stream 822 are transmitted through the coaxial cable 714 and arrive as the delayed backward cell stream 824 at the TDD M-adapter 706, delayed by the reverse propagation delay "d2". Typically, the propagation delay "d1" and the reverse propagation delay "d2" are essentially equal. The clocking and timing of the cell streams is designed to avoid overlapping on the coaxial cable 714. This is indicated in the diagram (FIG. 8) by a line pointing from the end of a cell in the delayed backward cell stream 824 (arriving at the TDD M-adapter 706) to the beginning of the next cell 808 (transmitted by the TDD M-adapter 706). Adaptive logic may be employed to dynamically select the frequency of the master clock 724 to achieve the correct timing, i.e. avoid overlap of cells in the forward and the reverse cell streams 814 and 822.

As has been demonstrated, full-duplex transmission of 100BaseT Ethernet signals over a single coaxial cable is accomplished with the Time Division Duplexing (TDD) Ethernet link 700 which permits two independent packet streams to be sent in opposing directions between standard MAC interfaces over a coaxial cable. Higher rate Ethernet signals such as Gigabit Ethernet (1000 Mb/s) can similarly be handled using higher clock rates and coaxial cable of sufficient bandwidth.

In a modification to the above embodiment, a transmission in a partial (not full) duplex mode is also possible, where the rate "Z" is less than "2E". It is also understood that segmentation and buffering can be avoided in the embodiment described above if base data rate is used in each direction, in which case the sum of the transmit and receive rates should be lower than or equal to the line rate.

Asymmetrical Transmission

It may sometimes be advantageous to have a higher speed available in one direction only. The familiar Asymmetric Digital Subscriber Loop (ADSL) technology provides an example where a higher downstream speed is provided at the expense of a lower up-stream speed, on the assumption that typically more data is transmitted from servers in the network to the subscriber than is transmitted from the subscriber into the network.

100/1000 Mb/s Link

An asymmetrical Ethernet-over-coax link may be constructed easily on the basis of the described symmetrical 100 Mb/s Ethernet-over-coax link 400, by using for example only a 10 Mb/s signal in one direction while using 100 Mb/s in the other. It may also be advantageous to build a link providing 1000 Mb/s (1 Gb/s) speed in one direction and 100 Mb/s in the other. Such a link could of course be provided as a subset of a symmetrical 1 Gb/s link as described above.

It may be more economical to build an asymmetrical full-duplex Ethernet-over-coax link that is designed specifically to provide Gb/s speed in only one direction, and 100 Mb/s in the other.

This could be readily achieved by a modification of the Time Division Duplexing (TDD) Ethernet link, in which different cell sizes are used in the two directions while retaining the synchronous cell stream structure and a common super-rate of approximately 1500 MHz, assuming 4B5B and 8B10B coding for 100 and 1000 Mb/s Ethernet respectively. Alternatively, different bit rates could be used in the two directions while keeping the cell sizes the same. Other combinations are possible as well. The introduction of an asymmetrical Ethernet link may not be covered by current Ethernet standards and it may not be possible to interface such a link to existing Ethernet equipment without additional changes.

Third Embodiment

Figure 9:
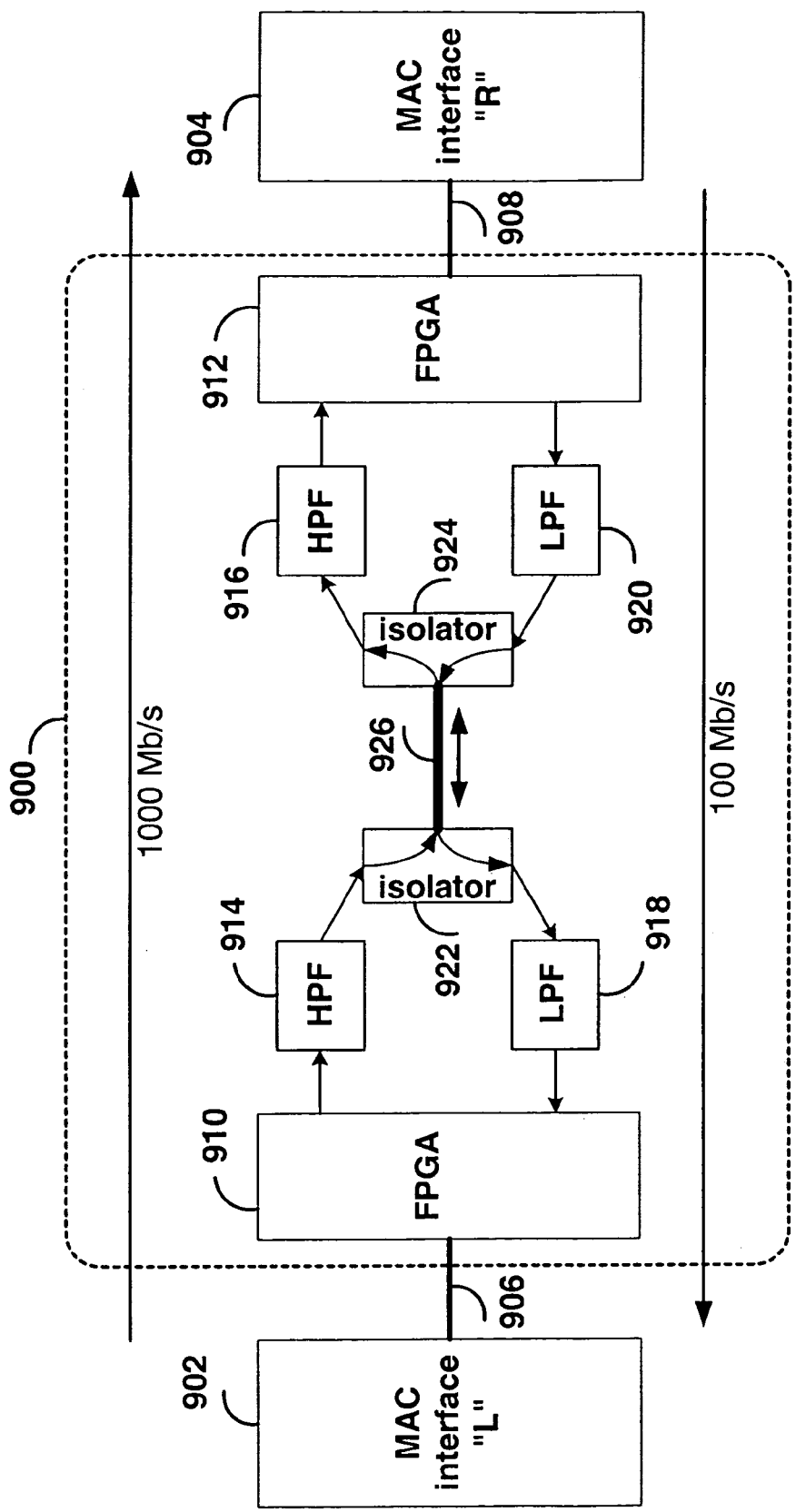
FIG. 9 shows a third embodiment of a full duplex Ethernet link over coax in the form of an Ethernet link with asymmetrical bit rates 900.

A third embodiment of a full duplex Ethernet link over coax is illustrated in FIG. 9. The diagram of FIG. 9 illustrates a full duplex Ethernet link with asymmetrical bit rates 900 ("asymmetric baseband link" for short). Shown in FIG. 9 are also two Ethernet MAC interfaces, MAC interface "L" 902 and MAC interface "R" 904, connected to the asymmetric baseband link 900 over multi-signal links 906 and 908 respectively.

Before continuing with the description of the asymmetric baseband link 900, the theoretical background for the approach taken, is given.

The operation of the asymmetric baseband link 900 is based on three observations from past experience:

(a) the bandwidth and attenuation characteristics of the coaxial cable are suitable for base band and frequency modulated signals up to at least 1000 MHz;

(b) the spectrum of a standard base band Ethernet signal of 100 Mb/s (100BaseT) is limited by virtue of the 4B5B and MLT-3 coding used, with energy centered around 33 MHz and limited to frequencies below about 125 MHz; and (c) the spectrum of a type of base band serial Ethernet signal of 1000 Mb/s (1000Base-X) that is commonly used over optical fiber cable is limited by virtue of the 8B10B coding used, with energy centered around 625 MHz and most energy content limited to a band from about 150 MHz to about 1250 MHz.

As a result, the spectra of a 100BaseT and a 1000Base-X signal can coexist in the frequency space provided by a coaxial cable, without any additional modulation.

Figure 10:
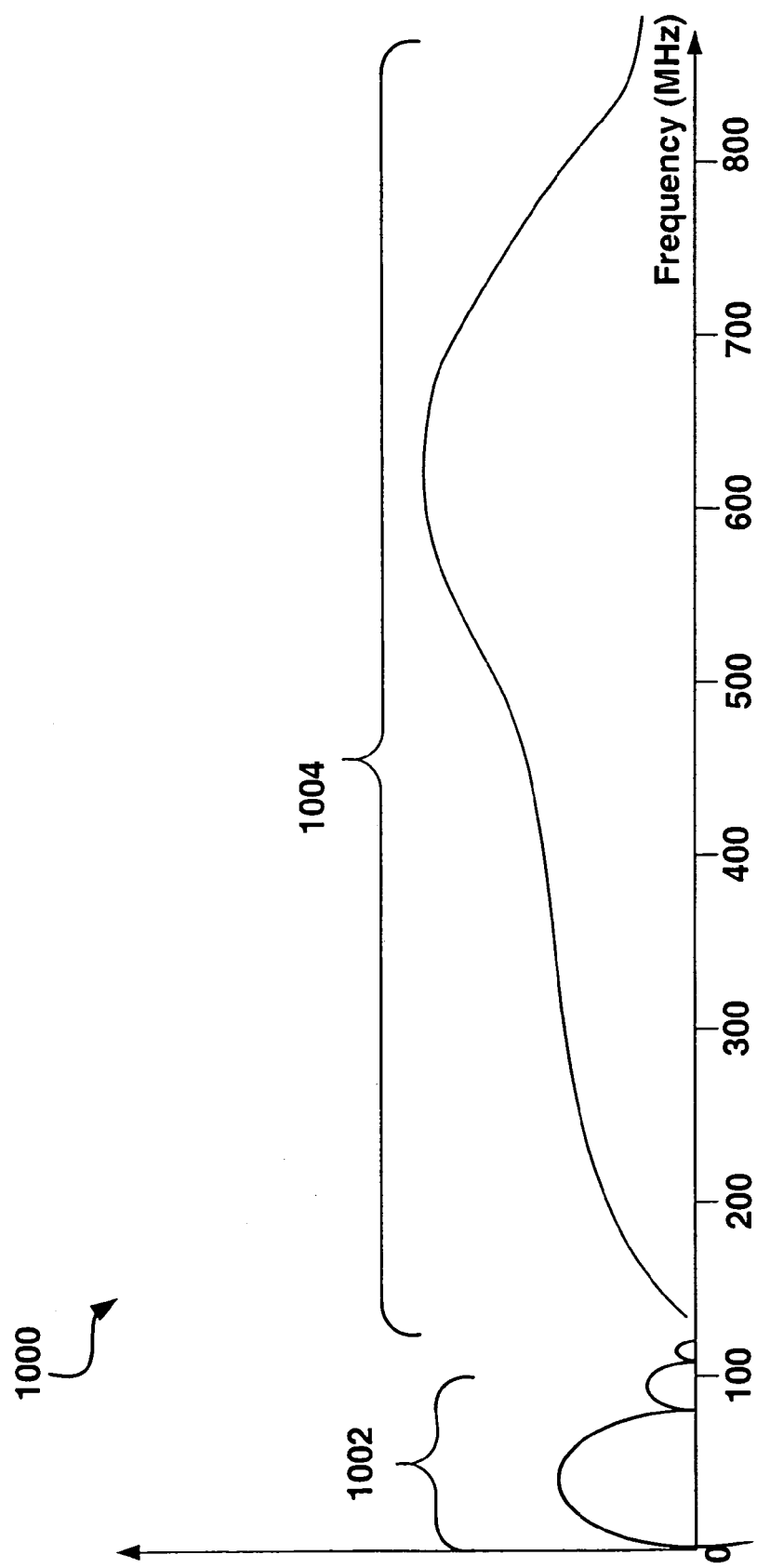
FIG. 10 shows a qualitative spectral density diagram 1000 of the Ethernet link with asymmetrical bit rates 900 of FIG. 9.

This is illustrated in FIG. 10 which shows a qualitative spectral density diagram 1000. The diagram 1000 covers a frequency range from 0 to about 800 MHz. Coaxial cable, such as video cable that is commonly installed to distribute cable television (CATV) signals in the CATV distribution network, has good transmission characteristics in this frequency range. The spectral density diagram shows two spectra, a 100BaseT base band spectrum 1002, representing approximately the spectrum of a base band 100 Mb/s Ethernet signal that is 4B5B and MLT-3 encoded as specified in the standard; and a 1000Base-X signal spectrum 1004. The base band spectrum 1002 occupies the range from just above 0 Hz to about 125 MHz. The 100BaseT Ethernet signal is thus a band limited signal with an upper frequency limit of about 125 MHz. The 1000Base-X signal spectrum 1004 ranges from about 125 to about 1250 MHz. The upper band limit of the spectrum of a 100BaseT base band signal 1002 is less than the lower limit of the 1000Base-X signal spectrum 1004, and it is thus possible to separate the two signals using high- and low-pass filters.

Returning to the FIG. 9, the asymmetric baseband link 900 comprises left and right field programmable gate arrays (FPGAs) 910 and 912; left and right high pass filters (HPF) 914 and 916 having a lower frequency limit of "X"; left and right low pass filters (LPF) 918 and 920 having an upper frequency limit of "X"; left and right isolators 922 and 924; and a coaxial cable 926. The frequency limit of "X" is preferably about 100 MHz.

The left FPGA 910 is connected to the MAC interface "L" 902 over the link 906 which constitutes a first standards based Ethernet interface for the asymmetric baseband link 900. The right FPGA 912 is similarly connected to the MAC interface "R" 904 over the link 908 which constitutes a second standards based Ethernet interface for the asymmetric baseband link 900. The FPGAs 910 and 912 are adapted to satisfy the requirements of the first and second standards based Ethernet interfaces provided by the links 906 and 908 respectively.

The left FPGA 910 is connected to one end of the coaxial cable 926 via the left high pass filter 914 and the left isolator 922 in the transmit direction, and via the left low pass filter 918 and the left isolator 922 in the receive direction.

Similarly, the right FPGA 912 is connected to the opposite end of the coaxial cable 926 via the right high pass filter 916 and the right isolator 924 in the transmit direction, and via the right low pass filter 920 and the right isolator 924 in the receive direction.

As indicated in the FIG. 9, the asymmetric baseband link 900 provides transmission of 1000 Mb/s Ethernet packets in one direction, left to right in the diagram, from the MAC interface "L" 902 to the MAC interface "R" 904, and transmission of 100 Mb/s Ethernet packets in the other direction, right to left in the diagram, from the MAC interface "R" 904 to the MAC interface "L" 902.

The left FPGA 910 receives a 1000 Mb/s Ethernet signal from the MAC interface "L" 902 over the link 906, in any standard form, for example 1000BaseT, or 100Base-ZX, 1000Base-LX, 1000Base-SX, 1000Base-CX, collectively referred to as a 1000Base-X signal. The signal is converted in the left FPGA 910 into an electronic form of the 1000Base-X standard, that is a serial bit stream, 8B10B encoded, at a baud rate of 1250 MHz (a format "A"). The 1250 Mbaud serial bit stream is transmitted through the left high pass filter 914 and the left isolator 922; over the coaxial cable 926; through the right isolator 924 and the right high pass filter 916; and finally the right FPGA 912. The isolators 922 and 924 are devices that allow signals to pass between their ports only in the directions indicated in the diagram. The isolator 922 in combination with the high pass filter 914 and the low pass filter 918 acts in a similar manner as the diplexer 426 of the A100-dongle 404 (FIG. 4) having a high-pass input 428, a low-pass output 430. The isolator 924 similarly resembles the diplexer 442 of the A100-dongle 404 (FIG. 4) having a high-pass output 444, a low-pass input 446. The right FPGA 912 then adapts the received bit stream into the 1000 Mb/s Ethernet format required by the MAC interface "R" 904, on the link 908.

In the opposite direction, the right FPGA 912 receives a 100 Mb/s Ethernet signal from the MAC interface "R" 908 over the link 908, in any standard form, for example 100BaseT, or 100Base-ZX, 1000Base-LX, 1000Base-SX, 1000Base-CX, collectively referred to as a 1000Base-X signal (a format "B"). The signal is converted in the right FPGA 912 into the form of the 100BaseT standard, that is a serial bit stream, 4B5B and MLT-3 encoded at a clock rate of 125 MHz. The resulting 125 Mbaud serial bit stream is transmitted through the right low pass filter 920 and the right isolator 924; over the coaxial cable 926; through the left isolator 922 and the left low pass filter 918; and finally into the left FPGA 910. The left FPGA 910 then adapts the received bit stream into the 100 Mb/s Ethernet format required by the MAC interface "L" 902, on the link 906.

In summary, the asymmetric baseband link 900 provides transmission of 1000 Mb/s Ethernet packets in one direction, and transmission of 100 Mb/s Ethernet in the other direction between standard MAC interfaces. Although in current Ethernet standards both directions of a full duplex link operate at the same speed, it is assumed that asymmetrical operation, as provided with the proposed asymmetric 1000/100 Mb/s link 900 may be readily accommodated by standard MAC components, or easily adapted to them. Logic circuits in the FPGAs 910 and 912 are available to be programmed for this adaptation as required. It is contemplated that in case of 1000Base-CX signals, the FPGA may not be required, with either pure passive filtering, or simple gain and filtering functions.

Applications

Three embodiments of a digital transmission link over (a single) coaxial cable for symmetrical and asymmetrical Ethernet have been described. These links may be advantageously employed in many types of networks that are already customarily based on coaxial cables, or may be converted to coaxial cable. An example of the former is cable television (CATV) distribution and access, an example of the latter is the simple home area network 200 (FIG. 2) that was converted to the coax-based home area network 300 (FIG. 3).

Figure 11:
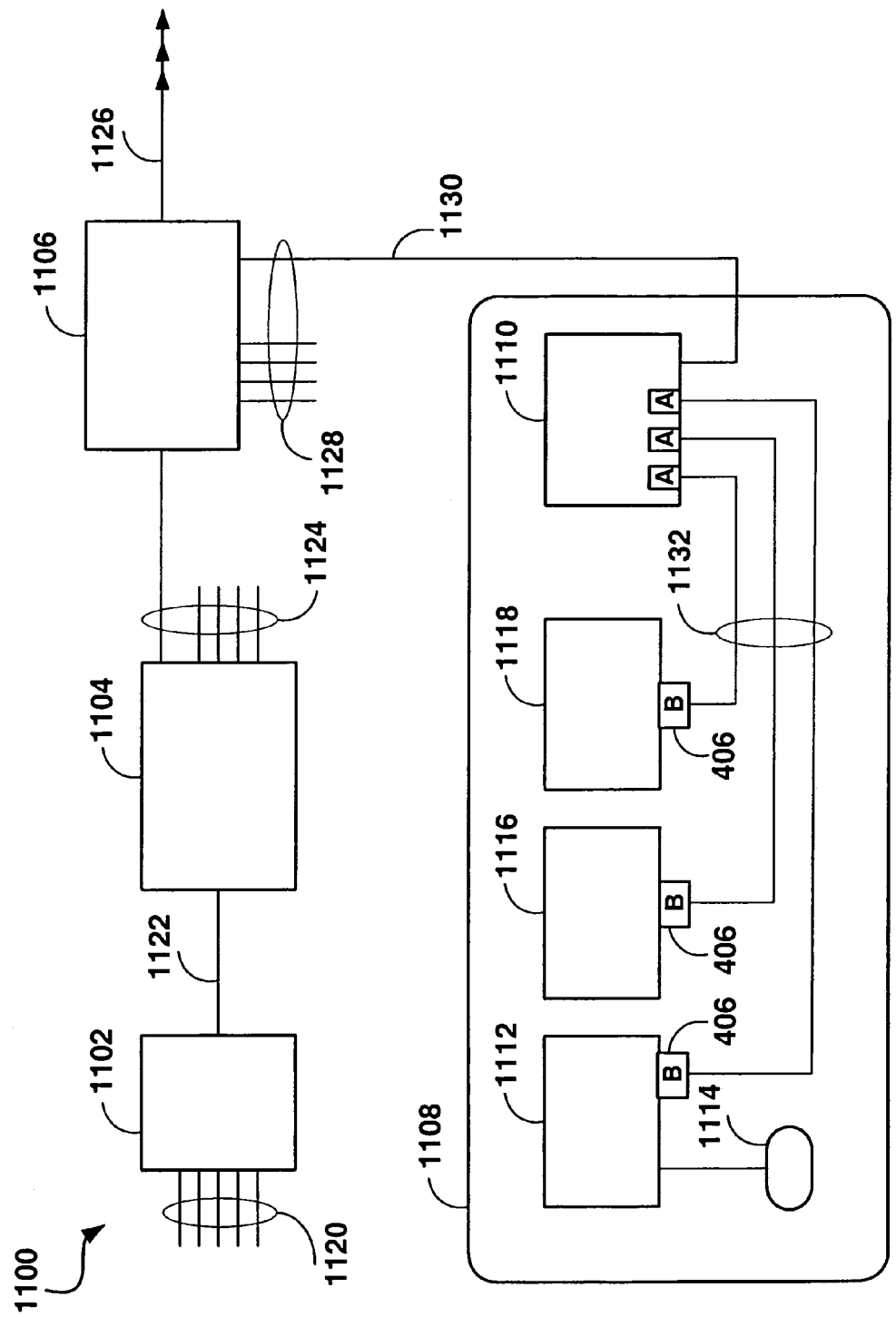
FIG. 11 shows an exemplary access network 1100 for the distribution of many types of digital services to a home.

In FIG. 11 is illustrated an exemplary access network 1100 for the distribution of many types of digital services to a home. This network is presented as an example of the advantageous use of full-duplex coaxial links providing Ethernet connections between different network elements. The access network 1100 is comprised of an Ethernet switch 1102, an Ether Node 1104, one or more Ether Taps 1106 (one shown), and one or more universal home network 1108 (one shown). The universal home network 1108 further comprises an Ether Port 1110, and any number of devices such as a set-top-box (STB) 1112 connected to a Television set 1114, an Ethernet telephone 1116, a personal computer (PC) 1118, and other devices (not shown) capable of being connected to an Ethernet link.

The Ethernet switch 1102 may be a conventional Ethernet switch. It is connected to digital services (e.g. broadcast television, a video-on-demand server, a router of the internet, or a voice-over-IP [VoIP] gateway) over various Ethernet links 1120. The Ethernet switch 1102 is also connected to an input of the Ether Node 1104 over one or more standards based Ethernet links 1122. The link 1122 may be a fiber link carrying a Gigabit Ethernet (GE) signal or 10GE signals.

The Ether Node 1104 may be a small, temperature-hardened switch for outdoor deployment. It is connected to at least one Ether Tap 1106 over one of a plurality of high-speed coax links 1124. Each of the high-speed coax links 1124 may be an asymmetric links providing 1000 Mb/s Ethernet in the downstream direction (from the Ether Node 1104 to the Ether Tap 1106) and 100 Mb/s Ethernet in the upstream direction. Each of the high-speed coax links 1124 may be implemented as a time division duplex link (TDD link 700, FIG. 7, modified to provide asymmetric operation) or an asymmetric baseband link (asymmetric baseband link 900, FIG. 9) according to the present invention. Alternatively, standards based Ethernet fiber links may be used.

The Ether Tap 1106 may also be a small, temperature-hardened switch, similar in design to the Ether Node 1104. The Ether Tap 1106 may be connected to a second Ether Tap (not shown) over a high-speed coax link 1126, and then to a third and so on, thus forming a chain of Ether Taps. The high-speed coax link 1126, and links connecting further Ether Taps downstream of the Ether Tap 1106 in the chain of Ether Taps may be implemented in the same manner as the high-speed coax links 1124.

The Ether Tap 1106 provides access to one or more universal home networks 1108 (only one shown) over drop coax links 1128, including the drop coax link 1130. The drop coax links 1128 may typically be full-duplex 100 Mb/s Ethernet-over-coax links such as the 100 Mb/s Ethernet coax link 400 described earlier (FIG. 4). The drop coax link 1130 connects the Ether Tap 1106 with the Ether Port 1110 of the universal home network 1108. Other Ether Taps (not shown) in the chain of Ether Taps downstream from the Ether Tap 1106 may feed additional universal home networks in a similar manner.

Within the universal home network 1108, the Ether Port 1110 is a small Ethernet switch having a number of 100 Mb/s Ethernet ports, such as described above (the coax-terminated Ethernet switch 602, FIG. 6). The Ether Port 1110 is shown connected to three types of digital terminals shown, the STB 1112, the Ethernet telephone 1116, and the personal computer (PC) 1118, over coax home wiring connections 1132, each such connection being of the form of the 100 Mb/s Ethernet coax link 400 (FIG. 4). Each coax home wiring connection 1132 is terminated with a B100-dongle 406 to provide standard 100BaseT (RJ-45) connections to the digital terminals (1112, 1116, 1118). The circuitry of the corresponding A100-dongles 404 is included in the Ether Port 1110.

The role of A100-dongles 404 and B100-dongles 406 of the coax home wiring connections 1132 may be reversed without loss of functionality, for example A100-dongles 404 may be used at the terminal ends, while the circuitry of the B100-dongles 406 may be included in the Ether Port 1110. This choice, or indeed whether to include the A- or B-type dongle circuitry in the Ether Port 1110 at all, or to use external dongles, will be made after considering other factors outside of the scope of the invention.

The access network 1100 has been shown to provide Ethernet access from Ethernet enabled terminals, such as set top boxes 1112, Ethernet telephones 1116, and PCs 1118 in a home through a series of Ethernet nodes (Ether Port 1110, Ether Tap 1106, Ether Node 1104, Ethernet switch 1102) and the Ethernet links 1120 to digital services (e.g. broadcast television, a video-on-demand server, a router of the internet, or a voice-over-IP [VoIP] gateway).

The standard Ethernet switch 1102, and the coax-enabled switches (Ether Port 1110, Ether Tap 1106, and Ether Node 1104) are adapted in their load and port capacities, their environmental hardening, and the types of ports, as required in their places in the access network 1100, primarily based on commercial considerations. In addition to Ethernet (layer 2) and IP (layer 3) switching and routing capabilities, they may further be equipped with means for authorization, and other functions that are customary in a public network.

Scope

While the access network 1100 described above is based on a tree hierarchy with a backbone starting with a high capacity fiber trunk (the link 1122, of 1GE or 10GE capacity) a distribution network of high-speed coax links 1124 and 1126 (of asymmetrical 1000/100 Mb/s capacity each), and symmetrical drop coax links 1128 of 100 Mb/s capacity), other combinations of link speeds, and using the full duplex Ethernet over coax link technology here presented, may also be configured within the scope of the invention.

Similarly, while a universal home network 1108 based on a single Ethernet switch (the Ether Port 1110) and 100 Mb/s Ethernet over coax technology has been presented as an example, other home networks using more Ethernet switches, and using higher or lower speed full duplex Ethernet over coax links (including 10/100 or 100/1000 asymmetrical links) may also be configured within the scope of the invention.

Although the invention has been described in embodiments based on Ethernet packet transmission, full duplex transmission or partial duplex transmission over coaxial cable in formats such as fiber link, HPPI (High Performance Peripheral Interface) and others, may also advantageously be provided, within the scope of the methods defined here.

What is claimed is:

1. A method for transmitting forward and backward sequences of Ethernet packets, each sequence coded to be suitable for uni-directional transmission over a physical medium, between a first and a second Ethernet interface over a single coaxial cable, the method comprising the steps of:
    (a) forming a backward signal from the backward coded sequence of packets at the first Ethernet interface for the transmission over the coaxial cable to the second Ethernet interface;
    (b) forming a forward signal from the forward coded sequence of packets at the second Ethernet interface for the transmission over the coaxial cable to the first Ethernet interface, including providing an asymmetry in frequency or time characteristics between the forward and backward signals to avoid interference between the backward and forward signals and allow the transmission of both signals at the same time;
    wherein the step (a) comprises coupling the backward coded sequence through a passive device to the coaxial cable;
    wherein the step (b) comprises the step of:
    modulating the forward coded sequence into a modulated coded signal having frequency spectrum above that of the backward coded sequence; and
    coupling the modulated coded signal through a second passive device to the coaxial cable; and
    wherein the forward and backward coded sequences are 100BaseT signals or 10BaseT signals, the backward coded sequence having a spectrum limited to below about 125 MHz, and the modulated coded signal having a frequency spectrum above about 125 MHz and below about a 1250 MHz.

2. A method as described in claim 1, wherein the passive device is a diplexer, and the second passive device is another diplexer.

3. A method for transmitting forward and backward sequences of Ethernet packets, each sequence coded to be suitable for uni-directional transmission over a physical medium, between a first and a second Ethernet interface over a single coaxial cable, the method comprising the steps of:
    (a) forming a backward signal from the backward coded sequence of packets at the first Ethernet interface for the transmission over the coaxial cable to the second Ethernet interface;
    (b) forming a forward signal from the forward coded sequence of packets at the second Ethernet interface for the transmission over the coaxial cable to the first Ethernet interface, including providing an asymmetry in frequency or time characteristics between the forward and backward signals to avoid interference between the backward and forward signals and allow the transmission of both signals at the same time;
    wherein the backward coded sequence of Ethernet packets is a signal coded according to a format "B" having a spectrum limited to below about "X" MHz, and the forward coded sequence is a signal coded according to another format "A" having a spectrum with a lower limit above about "X" MHz, and wherein the step (a) comprises coupling the backward coded sequence through a low pass filter with an upper frequency limit of about "X" MHz and an isolator to the coaxial cable, and the step (b) comprises coupling the forward coded sequence through a high pass filter having a lower frequency limit of about "X" MHz and another isolator to the coaxial cable.

4. A method as described in claim 3, wherein the forward and backward sequences of Ethernet packets are coded according to the one or more of the following coding schemes:
   4B/5B coding;
   multi-level transmission encoding - 3 levels (MLT-3 coding);
   8B/10B coding;
   non-return to zero (NRZ) coding; and
   Pulse Amplitude Modulation (PAM) coding.

5. A method as described in claim 3, wherein the coaxial cable is a video coaxial cable.

6. A method as described in claim 3, wherein the physical medium is one of the following:
   unshielded twisted pair (UTP);
   fiber optic cable.

7. A method as described in claim 3, wherein the first and second Ethernet interfaces are standard Ethernet interfaces.

8. A method as described in claim 3, wherein the transmitting is performed in a full duplex mode.

9. A method as described in claim 3, wherein the backward coded sequence is a differential coded signal, and wherein the step (a) comprises converting the differential coded signal into a single-ended coded signal.

10. A method as described in claim 9, wherein the step of modulating comprises modulating the forward coded sequence, which is a differential coded signal.

11. A method as described in claim 3, wherein any of the forward and backward coded sequences are one of the following signals:
    100BaseT signals;
    10BaseT signals;
    1000Base-X signals; and
    1000BaseT signals.

12. A method as described in claim 3, wherein the format "B" is 100BaseT, format "A" is 1000Base-X or 1000BaseT, and the frequency limit "X" is about 125 MHz.

13. A method for transmitting forward and backward sequences of Ethernet packets, each sequence coded to be suitable for uni-directional transmission over a physical medium, between a first and a second Ethernet interface over a single coaxial cable, the method comprising the steps of:
    (a) forming a backward signal from the backward coded sequence of packets at the first Ethernet interface for the transmission over the coaxial cable to the second Ethernet interface;
    (b) forming a forward signal from the forward coded sequence of packets at the second Ethernet interface for the transmission over the coaxial cable to the first Ethernet interface, including providing an asymmetry in frequency or time characteristics between the forward and backward signals to avoid interference between the backward and forward signals and allow the transmission of both signals at the same time;
    wherein the forward and backward sequences of Ethernet packets and interpacket gaps are sequences of coded symbols, and wherein the step (a) comprises buffering "Y" coded symbols arriving at a rate "E" of the sequence of packets and sending them in blocks of "Y" symbols at a rate "Z", leaving inter block gaps of a length which depends on the rate "Z".

14. A method as described in claim 13, wherein "Z" is less than or equal to "2E".

15. A method as described in claim 13, wherein "Z" is more than "2E".

16. A method as described in claim 15, wherein the step (b) comprises buffering "Y" coded symbols arriving at a rate "E" of the sequence of packets and sending them in blocks of "Y" symbols at the same rate "Z" during said inter block gaps.

17. A method as described in claim 16, wherein any of the forward and backward coded sequences are one of the following signals:
    100BaseT signals;
    10BaseT signals;
    1000Base-X signals; and
    1000Base-T signals.

18. A system for transmitting forward and backward sequences of Ethernet packets, each sequence coded to be suitable for uni-directional transmission over a physical medium, between a first and a second Ethernet interface over a single coaxial cable, the system comprising:
    (a) a means for forming a backward signal from the backward coded sequence of packets at the first Ethernet interface for the transmission over the coaxial cable to the second Ethernet interface;
    (b) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time;
    (c) a means for receiving the backward coded sequence from the coaxial cable and forwarding it to the second Ethernet interface;
    (d) a means for receiving the forward coded sequence from the coaxial cable and forwarding it to the first Ethernet interface;
    wherein the means for providing the asymmetry in frequency comprises means for coding the backward coded sequence of Ethernet according to a format "B" having a spectrum limited to below about "X" MHz, and the backward coded sequence according to another format "A" having a spectrum with a lower limit above about "X" MHz, and wherein the means (a) comprises means for coupling the backward coded sequence through a low pass filter with an upper frequency limit of about "X" MHz and an isolator to the coaxial cable, and the means (b) comprises a means for coupling the forward coded sequence through a high pass filter having a lower frequency limit of about "X" MHz and another isolator to the coaxial cable.

19. A system as described in claim 18, wherein the means (a) comprises a first passive device coupling the backward signal into the coaxial cable.

20. A system as described in claim 19, wherein the means (b) comprises:
    a mixer for modulating the forward coded sequence into a modulated coded signal having frequency spectrum above that of the backward coded sequence; and a second passive device coupling the modulated coded signal to the coaxial cable.

21. A system as described in claim 20, wherein the first and second passive devices are diplexers.

22. A system as described in claim 20, wherein the means (c) comprises said second passive device for separating the backward signal and the modulated coded signal.

23. A system as described in claim 20, wherein the means (d) comprises said first passive device for separating the backward signal and the modulated coded signal, and a detector for converting the modulated coded signal into a copy of the forward coded sequence.

24. A system as described in claim 18, wherein the format "B" is 100BaseT, and format "A" is 1000Base-X or 1000BaseT, and the frequency limit "X" is about 125 MHz.

25. An Ethernet link, comprising the system as described in claim 18, and a coaxial cable, wherein the means (a) and (d) are connected to the cable at one end, and the means (b) and (c) are connected to the cable at the other end.

26. An Ethernet network, comprising nodes and links between the nodes, wherein some of the links are the links as described in claim 25.

27. An Ethernet network as described in claim 26, the network being an access network.

28. An Ethernet network as described in claim 26, wherein the sequences of Ethernet packets carry any of the following services:
video;
data;
voice data;
voice over IP data;
images.

29. A system for transmitting forward and backward sequences of Ethernet packets, each sequence coded to be suitable for uni-directional transmission over a physical medium, between a first and a second Ethernet interface over a single coaxial cable, the system comprising:
(a) a means for forming a backward signal from the backward coded sequence of packets at the first Ethernet interface for the transmission over the coaxial cable to the second Ethernet interface;
(b) a means for forming a forward signal from the forward coded sequence of packets at the second Ethernet interface for the transmission over the coaxial cable to the first Ethernet interface, including a means for providing an asymmetry in frequency or time characteristics between the forward and backward signals so that to avoid interference between the backward and forward signals and allow the transmission of both signals at the same time;
(c) a means for receiving the backward coded sequence from the coaxial cable and forwarding it to the second Ethernet interface;
(d) a means for receiving the forward coded sequence from the coaxial cable and forwarding it to the first Ethernet interface;
the system providing the forward and backward sequences of Ethernet packets and interpacket gaps in the form of sequences of coded symbols, wherein the means (a) comprises a means for buffering "Y" coded symbols arriving at a rate "E" of the sequence of packets and sending them in blocks of "Y" symbols at a rate "Z", leaving inter block gaps of a length which depends on the rate "Z".

30. A system as described in claim 29, wherein "Z" is less than or equal to "2E".

31. A system as described in claim 29, wherein "Z" is more than "2E".

32. A system as described in claim 31, wherein the means (b) comprises a means for buffering "Y" coded symbols arriving at a rate "E" of the sequence of packets and sending them in blocks of "Y" symbols at the same rate "Z" during said inter block gaps.

33. A system as described in claim 32, wherein any of the forward and backward coded sequences are one of the following signals:
100BaseT signals;
10BaseT signals;
1000Base-X signals; and
1000BaseT signals.

* * * * *